United States Patent [19]
Marutani et al.

[11] Patent Number: 5,955,545
[45] Date of Patent: Sep. 21, 1999

[54] COATING FOR POLYOLEFIN CONTAINING COPOLYMER OF MONOMER WITH DISTANT OH

[75] Inventors: Yoshiaki Marutani; Mika Ohsawa, both of Hiroshima; Yasuyuki Takeuchi, Sagamihara; Hiroki Kagawa, Kamakura, all of Japan

[73] Assignee: Madza Motor Corporation, Hiroshima, Japan

[21] Appl. No.: 08/685,648

[22] Filed: Jul. 24, 1996

[30] Foreign Application Priority Data

Jul. 27, 1995 [JP] Japan .................................... 7-191318
Jul. 17, 1996 [JP] Japan .................................... 8-187064

[51] Int. Cl.$^6$ ............................ C08L 33/14; C08L 51/06; C08L 61/28
[52] U.S. Cl. .............................................. 525/162; 525/66
[58] Field of Search ....................................... 525/162, 66

[56] References Cited

U.S. PATENT DOCUMENTS

| 4,504,635 | 3/1985 | Weber, Jr. et al. ..................... 525/162 |
| 4,683,287 | 7/1987 | Koleske et al. ......................... 560/185 |
| 4,916,254 | 4/1990 | Watanabe et al. ...................... 560/185 |
| 5,064,695 | 11/1991 | Hotta et al. .......................... 427/407.1 |

FOREIGN PATENT DOCUMENTS

| 57-200438 | 12/1982 | Japan . |
| 59-27968 | 2/1984 | Japan . |
| 62-149734 | 7/1987 | Japan . |
| 4-132783 | 5/1992 | Japan . |
| 4-257545 | 9/1992 | Japan . |
| 5-117574 | 5/1993 | Japan . |
| WO 95/18170 | 7/1995 | WIPO . |

*Primary Examiner*—Robert E. Seller
*Attorney, Agent, or Firm*—Martin Fleit

[57] ABSTRACT

A coating for polyolefin molding compositions comprises (1) (a) from 40–90% by weight of a chlorinated polyolefin grafted with a vinyl-polymerizable monomer having a hydroxyl group at a position 15 to 40 atoms distant from the main chain of vinyl polymer grafted onto the chlorinated polyolefin, or (b) from 50 to 90% by weight of a vinyl polymer obtained by polymerizing from 5 to 40% by weight of a hydroxyl group-containing (meth)acrylate monomer having a carbon chain derived from an alcohol residue with from 6 to 18 carbon atoms, and a vinyl-polymerizable monomer having a hydroxyl group at a position 15 to 40 atoms distant from the vinyl group, wherein the vinyl polymerizable monomer is derived from the reaction product of a vinyl-polymerizable monomer having a hydroxyl group at a position 2 to 12 atoms distant from the vinyl group and a lactone, and (2) from 10 to 60 or 50% by weight of a melamine resin containing methylol, alkoxy or imino groups.

3 Claims, No Drawings

COATING FOR POLYOLEFIN CONTAINING COPOLYMER OF MONOMER WITH DISTANT OH

BACKGROUND OF THE INVENTION

The present invention relates to a coating resin composition, which has a high safety, provides a coating excellent in water resistance and solvent resistance, and is capable of easily and directly coating, particularly, polyolefin resin moldings; a coating resin composition therefor; and a method for coating with it.

Exterior parts of motorcars made of resins instead of metals or glass have come to be widely used. The use of resin moldings for forming, for example, bumpers, door mirror covers, moldings and spoilers is now increasing. Polyolefin resin materials are becoming to be used in a larger amount than urethane resins for forming such resin moldings for economical reasons. In addition, the polyolefin resins are excellent in chemical resistance, water resistance and moldability.

When such a polyolefin resin material is used, it is under more restrictions than metal coatings. For example, since the polyolefin resin material has a low polarity, the resultant coating has a poor adhesion. Another disadvantage of the polyolefin resin material is that since its thermal resistance is low, the coating must be heat-dried at a temperature of, for example, below 140° C.

Investigations have been made on various methods for improving the adhesion of the coating to the polyolefin resin moldings. They include, for example, a method wherein the surface of the polyolefin resin molding is pretreated by a flame treatment, corona discharge, plasma treatment, treatment with chromium sulfate or the like, and then the top-coating is conducted; and a method wherein the surface of the polyolefin resin molding is cleaned with a solvent such as trichloroethane, then the surface is coated with a primer having a high adhesion and the top-coating is conducted. However, the satisfactory adhesion is not always obtained by these methods and, in addition, these methods have problems in that they are complicated because of the large number of the steps and that the cost is high, since the specified expensive primer is used.

For improving these techniques, a method for improving the adhesion to the polyolefin resin molding by using a coating composition containing a chlorinated polyolefin resin has been proposed. Various coating compositions were proposed. They include, for example, (1) coating compositions comprising a mixture of a chlorinated polyolefin resin and acrylic resin [Japanese Patent Unexamined Published Application (hereinafter referred to as "J. P. KOKAI") No. Sho 57-200438, (2) coating compositions comprising a copolymer of a chlorinated polyolefin resin and acrylic monomer and, if necessary, a polyester prepolymer having a number-average molecular weight of 500 to 3,000, combined with an isocyanate compound (J. P. KOKAI Nos. Sho 59-27968, Sho 62-149734 and Hei 4-132783), (3) coating compositions comprising a combination of a copolymer of chlorinated polyolefin resin/acrylic monomer/chlorinated polydiene, with an isocyanate compound, and (4) coating compositions prepared by incorporating a hardener such as an isocyanate prepolymer or melamine resin into a mixture of a chlorinated polyolefin resin and an acrylic resin or into a product obtained by grafting an acrylic monomer onto a chlorinated polyolefin (J. P. KOKAI No. Hei 5-117574).

However, the coating composition (1) has defects in that the chlorine content thereof must be controlled to 35% by weight or below and in that, since the coating composition is easily divided into two phases, the properties such as the dispersion stability of the pigment, gloss of the coating, adhesion of the coating, solvent resistance and weather resistance are insufficient. Although the stability of the coating composition (2) is higher than that of the coating composition (1), the coating composition (2) has defects in that the gloss and weather resistance of the resultant coating are insufficient and in that the coating composition has problems of handling and safety, since the isocyanate compound has a strong toxicity. The coating from the coating composition (3) has insufficient solvent resistance and weather resistance and the coating composition has the same problems of handling and safety as those of the coating composition (2), since it also contains the isocyanate compound. The coating composition (4) has defects in that, when the isocyanate prepolymer is used, a problem of toxicity is caused and in that, when the melamine resin is incorporated, the water resistance and solvent resistance are reduced, since the hardening is insufficient.

Although various improved coating compositions have been thus proposed, they are yet insufficient in the field wherein a particularly high durability is strictly required as in the field of coating compositions for bumpers of motorcars. Therefore, they are used in only limited fields.

Under these circumstances, the development of a coating composition excellent in the handling properties and safety, capable of being cured at a low temperature and also providing a coating excellent in water resistance, solvent resistance and adhesion to the polyolefin resin moldings has been eagerly demanded.

SUMMARY OF THE INVENTION

Therefore, the object of the present invention is to provide a coating composition excellent in handling and safety, capable of being cured at a low temperature and also providing a coating excellent in durability such as water resistance and solvent resistance and adhesion is to the polyolefin resin moldings, as well as a coating method with the coating composition.

After intensive investigations made for the purpose of attaining the above-described object, the inventors have found that the object can be attained by the following technical constitutions, and the present invention has been completed on the basis of these findings:

1. A resin composition for coating polyolefin resin moldings, which comprises:

(1) 40 to 90% by weight of a grafted chlorinated polyolefin resin obtained by grafting a vinyl-polymerizable monomer onto a chlorinated polyolefin and containing a graft part having a hydroxyl group at a position of 15 to 40 atoms distant from the main chain of the vinyl polymer grafted onto the chlorinated polyolefin, the grafted chlorinated polyolefin resin having an acid value of 5 to 30 mg KOH/g, the graft part having a calculated glass transition temperature of −20 to 30° C., the amount of the graft part being 50 to 95% by weight, and the amount of the chlorinated polyolefin used for the production of the grafted chlorinated polyolefin resin being 50 to 5% by weight, and (2) 60 to 10% by weight of a methylol-type and/or imino-type melamine resin having a weight average molecular weight of 3,000 to 20,000;

2. a coating composition for polyolefin resin moldings, which comprises:

(1) a grafted chlorinated polyolefin resin obtained by grafting a vinyl-polymerizable monomer onto a chlorinated polyolefin and containing a graft part having a hydroxyl group at a position of 15 to 40 atoms distant from the main chain of the vinyl polymer grafted onto the chlorinated polyolefin, the grafted chlorinated polyolefin resin having an acid value of 5 to 30 mg KOH/g, the graft part having a calculated glass transition temperature of −20 to 30° C., the amount of the graft part being 50 to 95% by weight, and the amount of the chlorinated polyolefin used for the production of the grafted chlorinated polyolefin resin being 50 to 5% by weight, and (2) a methylol-type and/or imino-type melamine resin having a weight average molecular weight of 3,000 to 20,000;

the amount of the grafted chlorinated polyolefin resin (1) being 40 to 90% by weight and that of the melamine resin (2) being 60 to 10% by weight, based on the sum of the grafted chlorinated polyolefin resin (1) and the melamine resin (2);

3. a resin composition for coating polyolefin resin moldings, which comprises:

(1) 90 to 50% by weight of a vinyl polymer resin obtained by polymerizing 5 to 40% by weight of a (meth)acrylate monomer having a carbon chain derived from a linear or branched alcohol residue having 6 to 18 carbon atoms, the vinyl polymer resin containing 0.8 to 1.5 mol/Kg-resin of a primary hydroxyl group at a position of 15 to 40 atoms distant from the main chain of the vinyl polymer resin and having a calculated glass transition temperature of −15 to 10° C., and (2) 50 to 10% by weight of a methylol-type, complete alkoxy-type and/or imino-type melamine resin;

4. a coating composition for polyolefin resin moldings, which comprises:

(1) a vinyl polymer resin obtained by polymerizing 5 to 40% by weight of a (meth)acrylate monomer having a carbon chain derived from a linear or branched alcohol residue having 6 to 18 carbon atoms, the vinyl polymer resin containing 0.8 to 1.5 mol/Kg-resin of a primary hydroxyl group at a position of 15 to 40 atoms distant from the main chain of the vinyl polymer resin and having a calculated glass transition temperature of −15 to 10° C., and (2) a methylol-type, complete alkoxy-type and/or imino-type melamine resin, the amount of the vinyl polymer resin (1) being 50 to 90% by weight and that of the melamine resin (2) being 50 to 10% by weight based on the sum of the vinyl polymer resin (1) and the melamine resin (2); and 5. a process for coating a polyolefin resin molding with a coating composition (A), coating the coating composition (A), without baking, with a coating composition (B), and then baking the resultant coatings;

the coating composition (A) comprising:

(1) a grafted chlorinated polyolefin resin obtained by grafting a vinyl-polymerizable monomer onto a chlorinated polyolefin and containing a graft part having a hydroxyl group at a position of 15 to 40 atoms distant from the main chain of the vinyl polymer grafted onto the chlorinated polyolefin, the grafted chlorinated polyolefin resin having an acid value of 5 to 30 mg KOH/g, the graft part having a calculated glass transition temperature of −20 to 30° C., the amount of the graft part being 50 to 95% by weight, and the amount of the chlorinated polyolefin used for the production of the grafted chlorinated polyolefin resin being 5 to 50% by weight, and (2) a methylol-type and/or imino-type melamine resin having a weight average molecular weight of 3,000 to 20,000;

the amount of the grafted chlorinated polyolefin resin (1) being 40 to 90% by weight and that of the melamine resin (2) being 60 to 10% by weight, based on the sum of the grafted chlorinated polyolefin resin (1) and the melamine resin (2), and the coating composition (B) comprising:

(1) a vinyl polymer resin obtained by polymerizing 5 to 40% by weight of a (meth)acrylate monomer having a carbon chain derived from a linear or branched alcohol residue having 6 to 18 carbon atoms, the vinyl polymer resin containing 0.8 to 1.5 mol/Kg-resin of a primary hydroxyl group at a position of 15 to 40 atoms distant from the main chain of the vinyl polymer resin and having a calculated glass transition temperature of −15 to 10° C., and (2) a methylol-type, complete alkoxy-type and/or imino-type melamine resin, the amount of the vinyl polymer resin (1) being 50 to 90% by weight and that of the melamine resin (2) being 50 to 10% by weight, based on the sum of the vinyl polymer resin (1) and the melamine resin (2).

DESCRIPTION OF THE PREFERRED EMBODIMENTS

The grafted chlorinated polyolefin resin used for forming the coating composition (A) for coating the polyolefin resin molding is obtained by grafting a polymerizable vinyl monomer onto a chlorinated polyolefin to form a homopolymer or copolymer.

The chlorinated polyolefin is obtained by, for example, chlorinating a polyolefin itself or a polyolefin modified by introducing a carboxyl group, acid anhydride group or hydroxyl group thereinto. The polyolefins include, for example, polyethylene, polypropylene ethylene/propylene copolymer and polybutadiene.

The chlorinated polyolefin has a chlorine content of preferably 10 to 50% by weight. When it is above 50% by weight, the adhesion thereof to the polyolefin resin molding and weather resistance thereof are inclined to be reduced. On the contrary, when it is below 10% by weight, the solubility of the chlorinated polyolefin in the solvent is reduced, the stability of the coating composition at a low temperature is poor and the affinity thereof with a graft part which will be described below is also poor to make the appearance of the coating unsatisfactory.

The number-average molecular weight of the chlorinated polyolefin is usually 3,000 to 30,000, preferably 5,000 to 20,000. When the number-average molecular weight is below 3,000, the solvent resistance, hardness and adhesion are usually insufficient. On the contrary, when it is above 30,000, the viscosity of the coating composition becomes too high and a larger amount of a diluent solvent is necessitated to lower the solid content of the coating composition, to make the formation of thick coating difficult and to reduce the coating workability.

The chlorinated polyolefins include, for example, Hardrene 15 LLB (chlorine content: 30% by weight), Hardrene 14 LLB (chlorine content: 27% by weight), Hardrene 14 ML (chlorine content: 26.5% by weight) and Hardrene BS-40 (chlorine content: 40% by weight) (products by Toyo Kasei K.K.); and Superchlon 832 L (chlorine content: 27% by weight), Superchlon 773 H (chlorine content: 32% by weight) and Superchlon L-206 (chlorine content: 32% by weight)(products by Nippon Seishi K.K.).

The grafted chlorinated polyolefin resin has a graft part having a hydroxyl group at a position of 15 to 40 atoms distant from the main chain of the vinyl polymer grafted onto the chlorinated polyolefin. The graft part on the grafted chlorinated polyolefin resin is formed by grafing a vinyl-polymerizable monomer onto the chlorinated polyolefin.

The hydroxyl group is introduced into a predetermined position distant from the main chain of the grafted vinyl polymer by, for example, preferred processes given below.
(1) a process wherein a vinyl-polymerizable monomer having a vinyl group copolymerizable with a chlorinated polyolefin and a hydroxyl group at a position of 15 to 40 atoms distant from the vinyl group is grafted onto the chlorinated polyolefin.

Preferred examples of the vinyl-polymerizable monomers usable herein are those having a hydroxyl group and represented by the following formula (1):

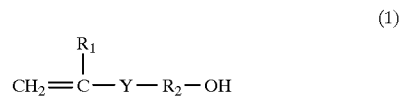

(1)

wherein $R^1$ represents a hydrogen atom or methyl group, Y represents —COO—, a single bond or —O—, and $R^2$ represents an alkylene group having 13 to 38 carbon atoms. (Meth)acrylic monomers of the formula wherein Y represents —COO— are particularly preferred. The alkylene groups are linear or branched alkylene groups such as tridecylene group and tetradecylene group. The vinyl-polymerizable monomers of the above formula include, for example, hydroxyl group-containing alkyl (meth) acrylates such as 13-hydroxytridecyl (meth)acrylate and 14-hydroxytetradecyl (meth)acrylate. These monomers can be reacted with a lactone in order to further elongate the distance between the vinyl group and a hydroxyl group. The lactones include, for example, ε-caprolactone, β-propiolactone, δ-valerolactone and γ-butyrolactone. The lactones are very useful for controlling the position of the hydroxyl group.
(2) A process wherein a lactone is reacted with a vinyl-polymerizable monomer having a hydroxyl group at a position of 2 to 12 atoms distant from the vinyl group to form a vinyl-polymerizable monomer (lactone adduct or polyester oligomer) having a hydroxyl group at a position of 15 to 40 atoms distant from the vinyl group, and then the vinyl-polymerizable monomer is grafted on a chlorinated polyolefin.

Preferred examples of the vinyl-polymerizable monomers to be reacted with the lactone herein include those of the above formula (1) wherein $R^2$ represents an alkylene group having 2 to 10 carbon atoms. Preferred examples of the vinyl-polymerizable monomers having a hydroxyl group at a position of 5 to 40 atoms distant from the vinyl group, which are obtained by the reaction with the lactone, include those of the following formula (2):

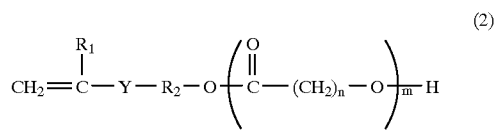

(2)

wherein $R^1$ and Y are as defined above, and $R^2$ represents an alkylene group having 2 to 10 carbon atoms as described above, n represents a number of 2 to 7, preferably 2 to 5, and m represents a number of 1 to 10, preferably 2 to 8.

The alkylene groups $R^2$ include linear or branched alkylene groups such as ethylene, propylene, butylene, isobutylene and hexamethylene groups.

The vinyl-polymerizable monomers of the above formula (2) can be prepared by reacting a primary or secondary hydroxyl group-containing alkyl (meth)acrylate such as 2-hydroxyethyl (meth)acrylate, 3-hydroxypropyl (meth)acrylate, 2-hydroxypropyl (meth)acrylate or 4-hydroxybutyl (meth)acrylate with a lactone.

Examples of the vinyl-polymerizable monomers (lactone adducts) of the above formula (2) include Placcel FM-1, FM-2, FM-3, FM-4, FA-1, FA-2, FA-3 and FA-4. In this case, "FM" means that the monomer is a methacrylate monomer. "FA" means that the monomer is an acrylate monomer. The number after the indication "FM-" or "FA-" means the number of a lactone (such as ε-caprolactone) as added.

Particularly preferred vinyl-polymerizable monomers include acrylic monomers of the following formula (3):

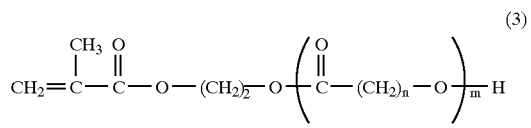

(3)

wherein n represents a number of 2 to 7 and m represents a number of 1 to 10.
(3) A process wherein a vinyl-polymerizable monomer having a hydroxyl group at a position of 2 to 12 atoms distant from the vinyl group is grafted onto a chlorinated polyolefin, and then a lactone is added to the hydroxyl group of the grafted chlorinated polyolefin oligomer in such a manner that the hydroxyl group is introduced at a position of 15 to 40 atoms distant from the main chain of the grafted vinyl polymer of the grafted chlorinated polyolefin resin.
(4) A process wherein a vinyl-polymerizable monomer, which is obtained by reacting an epoxy group-containing vinyl polymerizable monomer with a compound having a carboxyl group and then reacting the secondary hydroxyl group thus formed with a lactone, or which is obtained by reacting a carboxyl group-containing vinyl polymerizable monomer with a compound having an epoxy group and then reacting the resultant secondary hydroxyl group with a lactone, is graft-polymerized to obtain the grafted chlorinated polyolefin resin having a hydroxyl group at a position of 15 to 40 atoms distant from the main chain of the grafted vinyl polymer main chain.
(5) A process wherein a polyol (such as a diol, triol or tetraol) is reacted with an equivalent amount (in terms of the functional group) of an acid anhydride and/or dibasic acid to form a compound having a terminal carboxyl group and a terminal hydroxyl group, this compound is reacted with a vinyl-polymerizable monomer having an epoxy group or a vinyl-polymerizable monomer having an isocyanato group, and the resultant vinyl-polymerizable monomer is grafted on a chlorinated polyolefin. In this process, the epoxy group and isocyanato group react with the carboxyl group to form the vinyl-polymerizable monomer having the terminal hydroxyl group.

The polyols include diols such as ethylene glycol, propylene glycol, 1,5-hexanediol, 1,6-hexanediol, neopentyl glycol and cyclohexanedimethanol; trihydric alcohols such as trimethylolpropane, trimethylolethane and glycerol; and tetrahydric alcohols such as pentaerythritol and diglycerol.

The acid anhydrides include, for example, phthalic anhydride; alkylphthalic anhydrides such as 4-methylphthalic anhydride; hexahydrophthalic anhydride; alkylhexahydrophthalic anhydrides such as 3-methylhexahydrophthalic anhydride and 4-methylhexahydrophthalic anhydride; succinic anhydride; and tetrahydrophthalic anhydride. Particularly, the alkylphthalic anhydrides and alkylhexahydrophthalic anhydrides are preferably used because of easiness of the synthesis of them.

The dibasic acids include, for example, phthalic acid; alkylphthalic acids such as 4-methylphthalic acid; hexahydrophthalic acid; alkylhexahydrophthalic acids such as 3-methylhexahydrophthalic acid and 4-methylhexahydrophthalic acid; succinic acid; and tetrahydrophthalic acid.

The monomers containing an epoxy group, carboxyl group or isocyanate group are preferably those of the formula (4) given below wherein X represents an epoxy group, carboxyl group or isocyanate group. An example of the epoxy group-containing monomers is glycidyl (meth)acrylate. Preferred examples of the carboxyl group-containing vinyl-polymerizable monomers include (meth)acrylic acid and crotonic acid. The isocyanate group-containing monomers include, for example, isocyanate alkyl (meth)acrylates such as isocyanate ethyl (meth) acrylate.

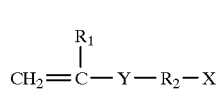

(4)

wherein $R_1$, X and Y are as defined above, and $R_2$ is as defined above or it represents an alkylene group having 2 to 12 carbon atoms. The alkylene groups include linear or branched alkylene groups. Examples of the alkylene groups include ethylene, propylene, butylene, pentylene, hexylene, heptylene, octylene, nonylene, decylene and undecylene groups.

(6) A process wherein a polyol is reacted with an equivalent (in terms of the functional group) of an acid anhydride to form a polyester oligomer having a terminal carboxyl group and a terminal hydroxyl group, the hydroxyl group of the oligomer is reacted with a lactone to prepare an oligomer having the terminal hydroxyl and carboxyl groups, or the above-described polyol is reacted with a lactone, the reaction product is reacted with an equivalent (to the hydroxyl group) of an acid anhydride and/or dibasic acid to prepare an oligomer having the terminal hydroxyl and carboxyl groups, and then the oligomer is reacted with a vinyl-polymerizable monomer having an epoxy group or a vinyl-polymerizable monomer having an isocyanate group to prepare a vinyl-polymerizable monomer which is in turn grafted on a chlorinated polyolefin.

(7) A process wherein a polyol is reacted with a lactone to form a compound having hydroxyl groups at both ends, the obtained compound is reacted with a monomer having a vinyl group and an isocyanate group, and the obtained vinyl-polymerizable monomer is grafted on a chlorinated polyolefin; or a process wherein a monomer having a vinyl group and an isocyanate group is grafted onto a chlorinated polyolefin, and the isocyanate group of the resultant grafted chlorinated polyolefin oligomer is reacted with a compound having hydroxyl groups at both ends which compound is obtained by reacting a polyol with a lactone.

Thus, in the present invention, the grafted chlorinated polyolefin resin having a hydroxyl group at a predetermined position distant from the main chain of the grafted vinyl polymer is obtained by directly or indirectly grafting the hydroxyl group-containing vinyl-polymerizable monomer onto the chlorinated polyolefin. In addition to the introduction of the hydroxyl groups at position of 15 to 40 atoms distant from the main chain of the grafted vinyl polymer resin, another hydroxyl group may be introduced into a position of 15 atoms or less distant from that. In such a case, the polyolefin is copolymerized with 2-hydroxyethyl (meth)acrylate, 3-hydroxypropyl (meth)acrylate, 4-hydroxybutyl (meth)acrylate or the like. Other processes for introducing a hydroxyl group at a predetermined position distant from the grafted vinyl polymer of the grafted chlorinated polyolefin resin are also possible. These processes are self-evident for those skilled in the art from the above-described processes. Thus, in the graft part, a functional group such as an ester bond or urethene bond can be present between the hydroxyl group and the grafted chlorinated polyolefin resin.

The acid value of the grafted chlorinated polyolefin resin is 5 to 30 mg KOH/g, preferably 10 to 20 mg KOH/g. When the acid value is below 5 mg KOH/g, the curing is insufficient, and the solvent resistance and water resistance are reduced. On the contrary, when the acid value is above 30 mg KOH/g, the storability of the coating composition is reduced and the coating composition is cured during the storage.

The calculated glass transition temperature of the graft part having a hydroxyl group at a predetermined position distant from the main chain of the grafted vinyl polymer of the grafted chlorinated polyolefin resin is calculated according to Fox's formula. It is −20 to 30° C., preferably −10 to 20° C. When the glass transition temperature is below −20° C., the solvent resistance and water resistance are reduced. On the contrary, when the glass transition temperature is above 30° C., the properties at low temperature become poor.

The amount of the graft part is 50 to 95% by weight, preferably 60 to 90% by weight, for 5 to 50% by weight, preferably 10 to 40% by weight of the chlorinated polyolefin. When the amount of the chlorinated polyolefin is below 5% by weight, the adhesion is poor and, on the contrary, when it is above 50% by weight, the solvent resistance and weather resistance are reduced.

The graft polymerization of the chlorinated polyolefin can be conducted by a known ordinary method such as radical polymerization method. The radical polymerization is conducted desirably in a solution. The solvent usable for the radical solution polymerization is any of the solvents used hitherto for the polymerization of a vinyl-polymerizable monomer such as an acrylic monomer. From the viewpoint of the solubility of the chlorinated polyolefin, an aromatic solvent is preferred. The aromatic solvents include, for example, toluene, xylene and Solvesso (a product of Exxon Corporation).

As an radical reaction initiator used for the radical solution polymerization, any of reaction initiators used hitherto for the radical polymerization is usable without particular limitation. The reaction initiators include peroxides such as benzoyl peroxide, lauroyl peroxide, t-butyl hydroperoxide and t-butylperoxy-2-ethylhexanoate; and azo compounds such as azobisvaleronitrile, azobisisobutyronitrile and azobis(2-methylpropionitrile).

If necessary, the vinyl-polymerizable monomer constituting the graft part having a hydroxyl group at a predetermined position distant from the main chain of the grafted vinyl polymer can be used in combination with a vinyl-polymerizable monomer constituting a graft part different from said graft part. The latter vinyl-polymerizable monomer is, for example, an α, β-ethylenically unsaturated monomer. Examples of the α, β-ethylenically unsaturated monomers are, for example, those described below:

(1) Acrylic acid, methacrylic acid and esters thereof:

They include, for example, carboxyl group-containing vinyl-polymerizable monomers such as acrylic acid and methacrylic acid; (meth)acrylic esters having an alcohol residue having 1 to 18 carbon atoms such as methyl acrylate, ethyl acrylate, propyl acrylate, isopropyl acrylate, butyl acrylate, isobutyl acrylate, t-butyl acrylate, octyl acrylate, 2-ethylhexyl acrylate, methyl methacrylate, ethyl methacrylate, propyl methacrylate, isopropyl methacrylate, butyl methacrylate, isobutyl methacrylate, t-butyl methacrylate, octyl methacrylate and 2-ethylhexyl methacrylate; and cyclic (meth)acrylates such as cyclohexyl (meth)acrylate, isobornyl (meth) acrylate and tetracyclododecyl (meth)acrylate.

Among them, cyclohexyl (meth) acrylate and isobornyl (meth) acrylate are preferred. For example, it is preferable that a cyclic (meth) acrylate such as cyclohexyl (meth) acrylate and isobornyl (meth) acrylate are co-used in an amount of 3 to 70 wt. %, preferably 5 to 60 wt. % based on the total amount of the vinyl polymerizable monomers used. When the amount is below 3 wt. %, the resutant coating is easy to swell and gasoline resistance and water resistance are apt to deteriorate. On the other hand, when the amount is over 65 wt. %, the resultant coating is apt to be hard and to brittle, and accordingly, the coating is easy to cause crack. In particular, cyclohexyl (meth) acrylate is preferred as compared with isobornyl (meth) acrylate, in view of balanced combination of coating strength and impact resistance.

A carboxyl group can be introduced as an optional functional group into the grafted chlorinated polyolefin resin by using also a carboxyl group-containing vinyl-polymerizable monomer.

(2) Vinyl compounds:

Such as styrene, α-methylstyrene, vinyltoluene and p-chlorostyrene.

(3) Polyolefin compounds:

Such as butadiene, isoprene and chloroprene.

(4) Others:

Such as methacrylamide, acrylamide, diacrylamide, dimethacrylamide, acrylonitrile, methacrylonitrile, methyl isopropenyl ketone, vinyl acetate, vinyl propionate, vinyl pivalate, N,N-dialkylaminoalkyl (meth)acrylates, phosphoric acid group-containing (meth)acrylates, e. g. phosphonoxyethyl (meth)acrylate, and perfluorovinyl ethers, e. g. trifluoromethyl vinyl ether.

The number average molecular weight of the grafted chlorinated polyolefin resin thus obtained is preferably 5,000 to 50,000. When the number average molecular weight is below 5,000, the gasoline resistance and weather resistance are easily reduced. On the contrary, when the number average molecular weight is above 50,000, the viscosity of the coating composition is apt to become too high and a larger amount of a solvent is apt to be necessitated to lower the solid content of the coating, to make the formation of thick coating difficult and to reduce the coating workability. The number average molecular weight is more preferably 7,000 to 35,000.

In the grafted chlorinated polyolefin resin, the hydroxyl group is positioned in the graft polymer part which is 15 to 40 atoms distant from the main chain of the grafted vinyl polymer. When the distance is shorter and is less than 15 atoms from the main chain of the grafted vinyl polymer, the reactivity becomes lower and the solvent resistance is reduced. On the other hand, when the distance is longer and is more than 40 atoms distant from the main chain of the grafted vinyl polymer, the coating becomes too soft and the solvent resistance is reduced. The preferred distance is 22 to 35 atoms distant from the main chain of the grafted vinyl polymer.

The amount of a hydroxyl group at a position of 15 to 40 atoms distant from the main chain of the grafted vinyl polymer of the grafted chlorinated polyolefin resin is preferably 0.3 to 2.0 mol/Kg-resin (in the grafted vinyl polymer part). When the amount of the hydroxyl group is less than 0.3 mol/Kg-resin, the crosslinking properties become insufficient and the solvent resistance is inclined to be reduced. On the contrary, when it is above 2.0 mol/Kg-resin, the coating becomes too soft and, therefore, the solvent resistance is easily reduced. More preferred amount thereof is 0.4 to 1.5 mol/kg-resin.

When the hydroxyl group is present at a position of 15 to 40 atoms distant from the main chain of the grafted vinyl polymer, a hydroxyl group may be introduced also into a position of less than 15 atoms distant from the main chain. In such a case, the amount of the hydroxyl group at a position of less than 15 atoms distant from the main chain is preferably 0 to 1 mol/Kg-resin, more preferably 0.1 to 0.8 mol/Kg-resin in the grafted vinyl polymer part.

The ratio of the amount of the hydroxyl group at a position of 15 to 40 atoms distant from the main chain of the grafted vinyl polymer to that of the hydroxyl group at a position of less than 15 atoms distant from the main chain is preferably 0.4–1.0 mol/Kg-resin to 0.2–0.7 mol/Kg-resin. In this range, the water resistance of the coating is further improved.

The grafted chlorinated polyolefin resin having any acid value can be obtained by using a monomer having any acid group such as a carboxyl group or phosphoric acid group like the vinyl-polymerizable monomer to be grafted so as to introduce such an acid group into the grafted chlorinated polyolefin oligomer.

The curing agent to be reacted with the hydroxyl group of the grafted chlorinated polyolefin resin is a methylol-type or imino-type melamine resin having a weight average molecular weight of 3,000 to 20,000, preferably 5,000 to 15,000. Since no isocyanate compound is used as the curing agent, the handleability and safety of the coating are excellent.

When the weight average molecular weight of the melamine resin is below 3,000, the water resistance is lowered. On the contrary, when it is above 20,000, the viscosity of the melamine resin becomes too high and, therefore, the coating formed in the coating step becomes too thin.

The melamine resin is produced by the polymerization of an addition product of melamine and formaldehyde, followed by the modification with an alcohol. Its production method is well-known to a person skilled in the art. Melamine resin containing the melamine derivative represented by the following formula in a molecule is used.

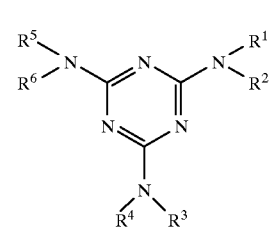

(5)

wherein $R^1$ to $R^5$ are independently a hydrogen atom, an alkoxymethyl group or a methylol group.

Any melamine resins are usable, which include for example, a single nucleus melamine resin wherein the above melamine derivative is singly contained and a polynucleus melamine resin wherein a plurality of the above melamines are condensed.

The melamine derivatives contained in the melamine resins include those wherein the groups $R^1$ to $R^6$ in the above formula are all hydrogen atoms, all alkoxymethyl groups, or all methylol groups, or the mixture thereof.

The methylol-type means the melamine resin wherein $R^1$ to $R^6$ of the above melamine derivative are mainly comprised of methylol group and alkoxymethyl groups. The imino-type means the melamine resin wherein $R^1$ to $R^6$ of the melamine derivative are mainly comprised of alkoxymethyl groups and hydrogen atoms.

In this case, the alkoxy group of the alkoxymethyl group includes an alkoxy group having 1 to 4 carbon atoms, such as methoxy, ethoxy, propoxy, butoxy and isobutoxy groups.

Particularly preferred melamine resins include, methylol-type or imino-type polynuclaric melamine resins, for example, Melane 22 (a product of Hitachi Chemical Co., Ltd.) (methylol type, weight average molecular weight: 5,000, nonvolatile matter content: 60%), Uvan 60R (a product of Mitsui Toatsu Chemicals, Inc.) (methylol type, weight average molecular weight: 7,000, nonvolatile matter content: 50%), Uvan 164 (imino type, weight average molecular weight: 6,000, nonvolatile matter content: 60%), Uvan 21R (imino type, weight-average molecular weight: 11,000, nonvolatile matter content: 50%) and Uvan 22R (imino type, weight average molecular weight: 7,000, nonvolatile matter content: 50%).

As for the relative amounts of the grafted chlorinated polyolefin resin to the melamine resin used, 40 to 90% by weight of the former is used for 60 to 10% by weight of the aminoplast resin. When the amount of the grafted chlorinated polyolefin resin is less than 40% by weight, the self-condensation reaction of melamine is accelerated to make the coating brittle, which is unsuitable for the coating for the polyolefin resin moldings. On the other hand, when the amount of the grafted chlorinated polyolefin resin is larger than 90% by weight, the crosslinking becomes insufficient and the solvent resistance and weather resistance are reduced. The preferred amount of the grafted chlorinated polyolefin resin is 50 to 85% byweight and, therefore, the amount of the melamine resin is 50 to 15% by weight.

The coating composition (A) of the present invention may suitably contain, if necessary, various additives usually used in the technical field of coating compositions, such as an acidic curing catalyst, coloring pigment, extender, aluminum powder, pearl mica powder, anti-sagging agent or anti-settling agent, levelling agent, dispersing agent, defoaming agent, ultraviolet absorber, light stabilizer, antistatic agent and thinner in addition to the indispensable components, i.e. the grafted chlorinated polyolefin resin and melamine resin.

Preferred acidic curing catalysts include, for example, weakly acidic catalysts such as phosphoric acids, phosphoric monoesters, phosphorous esters, unsaturated group-containing phosphoric esters and carboxylic acids. Among the weakly acidic catalysts, phosphoric acids and esters thereof are particularly preferred. The phosphoric acids and esters thereof include phosphoric acid, pyrophosphoric acid and mono- and diesters of phosphoric acid. The monoesters of phosphoric acids include, for example, monooctyl phosphate, monopropyl phosphate and monolauryl phosphate. The diesters of phosphoric acids include, for example, dioctyl phosphate, dipropyl phosphate and dilauryl phosphate. Vinyl-polymerizable monomers usable as the weakly acidic catalysts include, for example, mono(2-(meth) acryloyloxyethyl) acid phosphate, acrylic acid and methacrylic acid. Further, compounds produced by reacting a compound comprising an acid anhydride with a polyol or alcohol are also usable. To improve the water resistance, it is preferred to blend a resin (oligomer or polymer) having an acid value or to add an acid value to the grafted chlorinated polyolefin resin. The acid value can be added to the grafted chlorinated polyolefin resin or another resin by, for example, using a vinyl-polymerizable monomer having a carboxyl group or phosphoric acid group in the graft polymerization or (co)polymerization. The carboxyl group or phosphoric acid group is preferably at a position of at least 10 atoms distant from the main chain of the resin so as to make the reaction easy at a low temperature.

The coloring pigments include inorganic pigments such as titanium oxides [such as Typaque CR-95 (titanium oxide pigment produced by Ciba-Geigy)], carbon black, iron oxides, red iron oxide, lead molybdate, chromium oxide and lead chromate; and organic pigments such as phthalocyanine pigments, e. g. Phthalocyanine Blue and Phthalocyanine Green, red quinacridone pigments, azo pigments and anthraquinone pigments.

The extenders include, for example, kaolin, talc, silica, mica, barium sulfate and calcium carbonate.

Preferred anti-sagging agents or anti-settling agents are, for example, bentonite, castor oil wax, amide wax, microgel [such as MG 100 S (a product of Dainippon Ink and Chemicals, Inc.)] and aluminum acetate.

Preferred levelling agents are, for example, silicon-containing surfactants such as KF 69, KP 321 and KP 301 (products of shin-Etsu Chemical Co., Ltd.), Modaflow (a surface-controlling agent of Mitsubishi Monsanto Chemical Co.), BYK 301 and 358 (products of BYK Chemie Japan KK) and Diaaid AD 9001 (a product of Mitsubishi Rayon Co., Ltd.).

Preferred dispersing agents are, for example, Anti-Terra U, Anti-Terra P and Disperbyk-101 (products of BYK Chemie Japan KK).

An example of preferred defoaming agents is BYK-O (a product of BYK Chemie Japan KK.).

Preferred ultraviolet absorbers are, for example, benzotriazole ultraviolet absorbers such as Tinuvin 900, Tinuvin 384 and Tinuvin P (products of Ciba-Geigy) and oxalic anilide ultraviolet absorbers such as Sanduvor 3206 (a product of Sandoz).

Preferred light stabilizers are, for example, hindered amine light stabilizers such as Sanol LS 292 (a product of Sankyo Co., Ltd.), Sanduvor 3058 (a product of Sandoz) and Tinuvin 123 (a product of Ciba-Geigy).

Preferred thinners are, for example, aromatic compounds such as toluene, xylene and ethylbenzene; alcohols such as methanol, ethanol, propanol, butanol and isobutanol; ketones such as acetone, methyl isobutyl ketone, methyl amyl ketone, cyclohexanone, isophorone and N-methylpyrrolidone; ester compounds such as ethyl acetate, butyl acetate and methyl cellosolve; and mixtures of them.

In the preparation of the coating composition (A) of the present invention, the above-described grafted chlorinated polyolefin resin and melamine resin and, if necessary, additives such as the acidic dissociation catalyst and pigment are mixed together and the mixture is homogeneously dispersed with a dispersing machine such as a sand grind mill, ball mill or attritor.

The method for coating the coating composition (A) of the present invention comprises degreasing and cleansing the polyolefin resin molding by a well known treatment such as degreasing and cleansing with an organic solvent such as 1,1,1-trichloroethane, degreasing and cleansing with an alkali, cleansing with an acid or wipening with a solvent; directly coating the coating composition of the present invention by aerosol coating or airless coating, setting the coated composition, if necessary, for 0.5 to 120 minutes, preferably 1 to 20 minutes; and curing it by heating (baking) at a low temperature of 90 to 140° C., preferably 100 to 120° C. In the present invention wherein the curing is possible by heating at a temperature of as low as 140° C. or below, the coating having excellent coating properties can be formed without damaging the polyolefin resin molding.

The vinyl polymer resin used for forming the coating composition (B) to be coated on the coating composition (A) by wet-on-wet technique has a primary hydroxyl group at a position of 15 to 40 atoms distant from the main chain of the vinyl polymer. The primary hydroxyl group is introduced into a predetermined position distant from the main chain of the vinyl polymer by, for example, preferred processes given below.

(1) A process wherein a (meth)acrylate monomer having a carbon chain derived from a linear or branched alcohol residue having 6 to 18 atoms is copolymerized with a vinyl-polymerizable monomer having a primary hydroxyl group at a position of 15 to 40 atoms distant from the vinyl group.

The term "carbon chain having 6 to 18 atoms" in the (meth) acrylate monomer herein indicates a chain part having 6 to 18 carbon atoms and connected by means of a covalent bond by a carbon atom. This term includes a linear or branched carbon chain derived from an alcohol residue. The term "carbon covalent bond" also includes an unsaturated double bond.

Preferred examples of the linear carbon chains include lauryl group, stearyl group, tridecyl group and hexyl group. Preferred examples of the branched carbon chains include 2-ethylhexyl group, isooctyl group, isodecyl group and isostearyl group.

Preferred number of the atoms is 8 to 13.

When the carbon chain derived from the alcohol residue in the vinyl-polymerizable monomer has less than 6 atoms, the water resistance is poor and, on the contrary, when it exceeds 18, the coating film becomes too soft to obtain excellent water resistance and solvent resistance.

When the amount of the vinyl-polymerizablle monomer having a carbon chain of 6 to 18 atoms is less than 5% by weight, the appearance of the finished coating thus obtained is unsatisfactory and, on the contrary, when it exceeds 40% by weight, the solvent resistance is reduced. The amount is thus preferably 10 to 30% by weight.

Among the vinyl-polymerizable monomers used herein, vinyl-polymerizable monomers (1) having a hydroxyl group and represented by the above formula (1) are preferred.

In the formula (1), $R^1$ represents a hydrogen atom or methyl group, Y represents —COO—, a single bond or —O—, and $R^2$ represents an alkylene group having 13 to 38 carbon atoms. (Meth)acrylic monomers of the formula wherein Y represents —COO— are particularly preferred. The alkylene groups are linear or branched alkylene groups such as tridecylene group and tetradecylene group. The vinyl-polymerizable monomers of the above formula include, for example, hydroxyl group-containing alkyl (meth)acrylates such as 13-hydroxytridecyl (meth) acrylate and 14-hydroxytetradecyl (meth)acrylate. These monomers can be reacted with a lactone in order to further elongate the distance between the vinyl group and hydroxyl group. The lactones include, for example, ε-caprolactone, β-propiolactone, δ-valerolactone and γ-butyrolactone. The lactones are very useful for controlling the position of the hydroxyl group.

(2) A process wherein a lactone is reacted with a vinyl-polymerizable monomer having a hydroxyl group at a position of 2 to 12 atoms distant from the vinyl group to form a vinyl-polymerizable monomer (lactone adduct or polyester oligomer) having a primary hydroxyl group at a position of 15 to 40 atoms distant from the vinyl group, and then the vinyl-polymerizable monomer is copolymerized with the above-described (meth)acrylate monomer.

Preferred examples of the vinyl-polymerizable monomers to be reacted with the lactone herein include those of the above formula (1) wherein $R^2$ represents an alkylene group having 2 to 10 carbon atoms. Preferred examples of the vinyl-polymerizable monomers having a hydroxyl group at a position of 15 to 40 atoms distant from the vinyl group, which are obtained by the reaction with the lactone, include those of the above formula (2).

The vinyl-polymerizable monomers of the above formula (2) can be prepared by reacting a primary or secondary hydroxyl group-containing alkyl (meth)acrylate such as 2-hydroxyethyl (meth)acrylate, 3-hydroxypropyl (meth) acrylate, 2-hydroxypropyl (meth)acrylate or 4-hydroxybutyl (meth)acrylate with a lactone.

Examples of the vinyl-polymerizable monomers (lactone adducts) of the above formula (2) include Placcel FM-1, FM-2, FM-3, FM-4, FA-1, FA-2, FA-3 and FA-4.

Particularly preferred vinyl-polymerizable monomers include acrylic monomers of the above formula (3).

(3) A process wherein a vinyl-polymerizable monomer having a hydroxyl group at a position of 2 to 12 atoms distant from the vinyl group is copolymerized with the above-described (meth)acrylate monomer, and then a lactone is added to the hydroxyl group of the resultant copolymer in such a manner that the hydroxyl group is introduced into a position of 15 to 40 atoms distant from the main chain of the vinyl polymer.

(4) A process wherein a polyol (such as a diol, triol or tetraol) is reacted with an equivalent (in terms of the functional group) of an acid anhydride and/or dibasic acid to form a compound having a terminal carboxyl group and a terminal hydroxyl group, this compound is reacted with a vinyl-polymerizable monomer having an epoxy group or a vinyl-polymerizable monomer having an isocyanate group, and the resultant vinyl-polymerizable monomer is copolymerized with the above-described (meth)acrylate monomer. In this process, the epoxy group and isocyanato group react with the carboxyl group to form the vinyl-polymerizable monomer having the terminal hydroxyl group.

The polyols include diols such as ethylene glycol, propylene glycol, 1,5-hexanediol, 1,6-hexanediol, neopentyl glycol and cyclohexanedimethanol; trihydric alcohols such as trimethylolpropane, trimethylolethane and glycerol; and tetrahydric alcohols such as pentaerythritol and diglycerol.

The acid anhydrides include, for example, phthalic anhydride; alkylphthalic anhydrides such as 4-methylphthalic anhydride; hexahydrophthalic anhydride; alkylhexahydrophthalic anhydrides such as 3-methylhexahydrophthalic anhydride and 4-methylhexahydrophthalic anhydride; succinic anhydride; and tetrahydrophthalic anhydride. Particularly, the alkylphthalic anhydrides and alkylhexahydrophthalic anhydrides are preferably used because of easiness of the synthesis of them.

The dibacic acids include, for example, phthalic acid; alkylphthalic acids such as 4-methylphthalic acid; hexahydrophthalic acid; alkylhexahydrophthalic acids such as 3-methylhexahydrophthalic acid and 4-methylhexahydrophthalic acid; succinic acid; and tetrahydrophthalic acid.

The monomers containing an epoxy group or isocyanate group are preferably those of the above formula (4) wherein X represents an epoxy group or isocyanate group. Preferred examples of them include isocyanate alkyl (meth)acrylates such as glycidyl (meth)acrylate and isocyanate ethyl (meth)acrylate.

(5) A process wherein a polyol is reacted with an equivalent (in terms of the functional group) of an acid anhydride to form a polyester oligomer having a terminal carboxyl group and a terminal hydroxyl group, the hydroxyl group of the oligomer is reacted with a lactone to prepare an oligomer having the terminal hydroxyl and carboxyl groups, or the above-described polyol is reacted with a lactone, the reaction product is reacted with an equivalent (to the hydroxyl group) of an acid anhydride and/or dibasic acid to prepare an oligomer having the terminal hydroxyl and carboxyl groups, the resultant oligomer is reacted with a vinyl-polymerizable monomer having an epoxy group or a vinyl-polymerizable monomer having an isocyanate group, and then the obtained vinyl-polymerizable monomer is copolymerized with the above-described (meth)acrylate monomer.

(6) A process wherein a polyol is reacted with a lactone to form a compound having hydroxyl groups at both ends, the obtained compound is reacted with a monomer having a vinyl group and an isocyanate group, and the obtained vinyl-polymerizable monomer is copolymerized with the above-described (meth)acrylate monomer; or a process wherein a monomer having a vinyl group and an isocyanate group is copolymerized with the above-described (meth)acrylate monomer, and the isocyanate group of the resultant vinyl polymer resin is reacted with a compound having hydroxyl groups at both ends which compound is obtained by reacting a polyol with a lactone.

The copolymerization of the vinyl-polymerizable monomer and/or (meth)acrylate monomer can be conducted by a known, ordinary method such as radical polymerization method. The radical polymerization is conducted desirably in a solution. The solvent usable for the radical solution polymerization is any of the solvents used hitherto for the polymerization of a vinyl-polymerizable monomer such as an acrylic monomer. The solvents include aromatic solvents such as toluene, xylene and Solvesso (a product of Exxon Corporation); ester solvents such as butyl acetate and isopropyl acetate; ketone solvents such as methyl ethyl ketone and cyclohexanone; alcohol solvents such as butanol and isobutanol; and mixtures of them.

As the radical reaction initiator used for the radical solution polymerization, any reaction initiators used hitherto for the radical polymerization is usable without particular limitation. The reaction initiators include peroxides such as benzoyl peroxide, lauroyl peroxide, t-butyl hydroperoxide and t-butylperoxy-2-ethylhexanoate; and azo compounds such as azobisvaleronitrile, azobisisobutyronitrile and azobis(2-methylpropionitrile).

As the vinyl-polymerizable monomer copolymerizable with the vinyl-polymerizable monomer constituting the graft part having a hydroxyl group at a predetermined position distant from the main chain of the grafted vinyl polymer, an α, β-ethylenically unsaturated monomer other than the (meth)acrylate monomers having a carbon chain derived from the linear or branched alcohol residue part having 6 to 18 carbon atoms can be used. Examples of the α, β-ethylenically unsaturated monomers are, for example, those described below:

(1) Acrylic acid, methacrylic acid and esters thereof:
They include, for example, carboxyl group-containing vinyl-polymerizable monomers such as acrylic acid and methacrylic acid; (meth)acrylic esters having an alcohol residue having 1 to 5 carbon atoms such as methyl acrylate, ethyl acrylate, propyl acrylate, isopropyl acrylate, butyl acrylate, isobutyl acrylate, t-butyl acrylate, methyl methacrylate, ethyl methacrylate, propyl methacrylate, isopropyl methacrylate, butyl methacrylate, isobutyl methacrylate and t-butyl methacrylate; and cyclic (meth)acrylates such as cyclohexyl (meth) acrylate, isobornyl (methacrylate) and tetracyclododecyl (meth)acrylate.

(2) Vinyl compounds:
Such as styrene, a -methylstyrene, vinyltoluene and p-chlorostyrene.

(3) Polyolefin compounds:
Such as butadiene, isoprene and chloroprene.

(4) Others:
Such as methacrylamide, acrylamide, diacrylamide, dimethacrylamide, acrylonitrile, methacrylonitrile, methyl isopropenyl katone, vinyl acetate, vinyl propionate, vinyl pivalate, N,N-dialkylaminoalkyl (meth)acrylates, phosphoric acid group-containing (meth)acrylates such as phosphonoxyethyl (meth)acrylate, and perfluorovinyl ethers such as trifluoromethyl vinyl ether.

The number average molecular weight of the vinyl polymer resin thus obtained is preferably 2,000 to 10,000. When the number average molecular weight is below 2,000, the gasoline resistance and weather resistance are apt to be easily reduced. On the contrary, when the The number average molecular weight is above 10,000, the viscosity of the coating is apt to become too high and a larger amount of a solvent is apt to be necessitated to lower the solid content of the coating, to make the formation of thick coating difficult and to reduce the coating workability. The number average molecular weight is more preferably 3,000 to 8,000.

In the vinyl polymer resin, the primary hydroxyl groups are positioned in the graft polymer part at 15 to 40 atoms distant from the main chain of the vinyl polymer. When the distance is shorter and is less than 15 atoms from the main chain of the vinyl polymer, the reactivity becomes lower and the solvent resistance is reduced. On the other hand, when the distance is longer and is more than 40 atoms distant from the main chain of the vinyl polymer, the coating film becomes too soft and the solvent resistance is reduced. The preferred distance is 22 to 35 atoms distant from the main chain of the vinyl polymer.

The amount of the primary hydroxyl groups in the vinyl polymer resin is 0.8 to 1.5 mol/Kg-resin. When the amount of these hydroxyl groups is less than 0.8 mol/Kg-resin, the crosslinking properties become insufficient. On the contrary, when it is above 1.5 mol/Kg-resin, the coating film becomes too soft and, therefore, the solvent resistance is easily reduced. Preferred amount thereof is 1.0 to 1.3 mol/Kg-resin.

The glass transition temperature of the vinyl polymer resin is −15 to 10° C. When the glass transition temperature is below −15° C., the coating film becomes too soft and, therefore, the water resistance and solvent resistance are reduced. On the other hand, when the glass transition temperature is above 10° C., the coating becomes brittle and unsuitable for use for soft substances such as bumpers. The preferred glass transition temperature ranges from −10° C. to 5° C.

The curing agent to be reacted with the primary hydroxyl group of the vinyl polymer resin is an imino-type, methylol-type or complete alkoxy-type melamine resin. Since no isocyanate compound is used as the curing agent, the handleability and safety of the coating composition are excellent.

The complete alkoxy-type melamine resin is meant as melamine resins containing the melamine of the formula (5) above in the molecule, wherein all of $R^1$ to $R^6$ in the formula (5) above are alkoxymethyl groups.

The imino-type melamine resins include, for example, Superbekamine L-121-60 (solid content: 60%) (a product of Dainippon Ink and Chemicals, Inc.); Melane 2000 (nonvolatile matter content: 50%) and Melane 289 (nonvolatile matter content: 50%) (products of Hitachi Chemical Co., Ltd.); and Uvan 22R (nonvolatile matter content: 60%), Uvan 21R (nonvolatile matter content: 50%), Uvan 2028 (nonvolatile matter content: 75%), Uvan 220 (nonvolatile matter content: 60%), Uvan 225 (nonvolatile matter content: 60%) and Uvan 164 (nonvolatile matter content: 60%) (products of Mitsui Toatsu Chemicals, Inc.). The nmethylol-type melamine resins include, for example, Uvan 60R (nonvolatile matter content: 50%), Uvan 122 (nonvolatile matter content: 60%) and Uvan 166 (nonvolatile matter content: 60%) (products of Mitsui Toatsu Chemicals, Inc.). The complete alkoxy-type melamine resins include, for example, Cymel 303 (nonvolatile matter content: 98%) (a product of Mitsui Cytec and Uvan 120 (nonvolatile matter content: 96%) (a product of Mitsui Toatsu Chemicals, Inc.).

As for the relative amounts of the vinyl polymer resin to the melamine resin used, 50 to 90% by weight of the former is used for 50 to 10% by weight of the latter. When the amount of the vinyl polymer resin is less than 50% by weight, the self-condensation reaction of melamine is accelerated to make the coating brittle, which is unsuitable for the coating for the polyolefin resin moldings. On the other hand, when the amount of the vinyl polymer resin is larger than 90% by weight, the crosslinking becomes insufficient and the solvent resistance and weather resistance are reduced. The preferred amount of the vinyl polymer resin is 50 to 85% by weight and, therefore, the amount of the melamine resin is 15 to 50% by weight.

The coating composition (B) of the present invention may suitably contain, if necessary, an acidic curing catalyst in addition to the indispensable components, i.e. vinyl polymer resin and melamine resin. The total acid value of the vinyl polymer resin, melamine resin and acidic curing catalyst used if necessary is preferably 5 to 50 mgKOH/g, more preferably 20 to 45 mgKOH/g. When the total acid value is below 5 mgKOH/g, the crosslinking reactivity is apt to be easily reduced to make the crosslinking insufficient and, therefore, to reduce the gasoline resistance and weather resistance. On the contrary, when the acid value is above 50 mgKOH/g, the storability and water resistance are apt to be easily reduced.

The vinyl polymer resin having such an acid value can be obtained by using a monomer having an acid group such as carboxyl group or phosphoric acid as the vinyl-polymerizable monomer to be copolymerized.

The acidic curing catalysts usable herein include strongly acidic catalysts and weakly acidic catalysts. The strongly acidic catalysts include inorganic acids such as hydrochloric acid, nitric acid and sulfuric acid; organic acids such as sulfonic acids; and esters, ammonium salts and onium salts of them. The strongly acidic catalysts are preferably sulfonic acids, esters thereof and amine salts thereof, benzoic acid, trichloroacetic acid, etc. The sulfonic acids include aliphatic sulfonic acids such as methanesulfonic acid and ethanesulfonic acid; and aromatic sulfonic acids such as p-toluenesulfonic acid, dodecylbenzenesulfonic acid, napthalenedisulfonic acid, dinonylnaphthalenesulfonic acid and dinonylnaphthalenedisulfonic acid. Preferred strongly acidic catalysts are aromatic sulfonic acids and esters thereof. In particular, dodecylbenzenesulfonic acid and dinonylnaphthalenedisulfonic acid are preferred, since they are effective in improving the water resistance of the coating film.

On the other hand, the weakly acidic catalysts include, for example, phosphoric acids, phosphoric monoesters, phosphorous esters, unsaturated group-containing phosphoric esters and carboxylic acids. Among the weakly acidic catalysts, phosphoric acids and esters thereof are particularly preferred. The phosphoric acids and esters thereof include phosphoric acid, pyrophosphoric acid and mono- and diesters of phosphoric acid. The monoesters of phosphoric acids include, for example, monooctyl phosphate, monopropyl phosphate and monolauryl phosphate. The diesters of phosphoric acids include, for example, dioctyl phosphate, dipropyl phosphate and dilauryl phosphate. They further include mono(2-(meth)acryloyloxyethyl) acid phosphate. Further, compounds produced by reacting a compound comprising an acid anhydride with a polyol or alcohol are also included therein. It is also possible to blend an oligomer having an acid value therein. The acid value can be added to the vinyl polymer resin or another oligomer by, for example, using a vinyl-polymerizable monomer having a carboxyl group or phosphoric acid group in the copolymerization of the vinyl polymer resin. The carboxyl group or phosphoric acid group is preferably present at a position of at least 10 atoms distant from the main chain of the oligomer, so as to easily conduct the reaction at a low temperature.

The amount of the acidic curing catalyst is 0.001 to 10% by weight, preferably 0.001 to 5% by weight, based on the whole vinyl polymer resin and melamine resin.

The coating composition (B) of the present invention can suitably contain various additives usually used in the technical field of coating compositions, such as a coloring coating, dye, anti-sagging agent or anti-settling agent, levelling agent, dispersing agent, defoaming agent, ultraviolet absorber, light stabilizer, antistatic agent and thinner in addition to the above-described components.

The coloring pigments include inorganic pigments such as titanium oxides [e. g. Typaque CR-95 (titanium oxide pigment produced by Ciba-Geigy)], carbon black, iron oxides, red iron oxide, lead molybdate, chromium oxide and lead chromate; and organic pigments such as phthalocyanine pigments, e. g. Phthalocyanine Blue and Phthalocyanine Green, red quinacridone pigments, azo pigments and anthraquinone pigments.

Preferred anti-sagging agents or anti-settling agents are, for example, bentonite, castor oil wax, amide wax, microgel [such as MG 100 S (a product of Dainippon Ink and Chemicals, Inc.)] and aluminum acetate.

Preferred levelling agents are, for example, silicon-containing surfactants such as KF 69, KP 321 and KP 301 (products of shin-Etsu Chemical Co., Ltd.), Modaflow (a surface-controlling agent of Mitsubishi Monsanto Chemical Co.), BYK 301 and 358 (products of BYK Chemie Japan KK) and Diaaid AD 9001 (a product of Mitsubishi Rayon Co., Ltd.).

Preferred dispersing agents are, for example, Anti-Terra U, Anti-Terra P and Disperbyk-101 (products of BYK Chemie Japan KK).

An example of preferred defoaming agents is BYK-O (a product of BYK Chemie Japan KK.).

Preferred ultraviolet absorbers are, for example, benzotriazole ultraviolet absorbers such as Tinuvin 900, Tinuvin 384 and Tinuvin P (products of Ciba-Geigy) and oxalic anilide ultraviolet absorbers such as Sanduvor 3206 (a product of Sandoz).

Preferred light stabilizers are, for example, hindered amine light stabilizers such as Sanol LS 292 (a product of Sankyo Co., Ltd.) and Sanduvor 3058 (a product of Sandoz).

Thinners are, for example, aromatic compounds such as toluene, xylene and ethylbenzene; alcohols such as methanol, ethanol, propanol, butanol and isobutanol; ketones such as acetone, methyl isobutyl ketone, methyl amyl ketone, cyclohexanone, isophorone and N-methylpyrrolidone; ester compounds such as ethyl acetate, butyl acetate and methyl cellosolve; and mixtures of them.

Preferred antistatic agents include, for example, Esocard (a product of Lion Armor).

In the preparation of the coating composition (B), the vinyl polymer resin, aminoplast resin and, if necessary, additives such as an acidic dissociation catalyst and pigment are mixed together, and then the mixture is further homogenized with a sand grind mill, ball mill or attriter.

The coating composition (A) and the coating composition (B) of the present invention can be directly coated onto the surface of a polyolefin resin molding. The method for coating (method for forming coating) comprises degreasing and cleansing the polyolefin resin molding by a well known treatment such as degreasing and cleansing with an organic solvent, e. g. 1,1,1-trichloroethane, degreasing and cleansing with an alkali, cleansing with an acid or wipening with a solvent, directly coating the coating composition (A) by aerosol coating or airless coating, setting the coated composition, if necessary, for 0.5 to 120 minutes, preferably 1 to 20 minutes, and curing it by heating (baking) at a low temperature of 90 to 140° C., preferably 100 to 120° C. In the present invention wherein the curing is possible by heating at a temperature of as low as 140° C. or below, the coating film having excellent coating properties can be formed without damaging the polyolefin resin molding.

The coating method with the coating composition of the present invention is a two coat-one bake method, three coat-one bake method or three coat-two bake method. The two coat-one bake method is one of top coating methods. In this method, a base coating containing a large amount of a pigment and/or metal powder is coated, then a clear coating or a color clear coating containing a low pigment or dye content is coated to form a top coating and then the coatings are baked at a time. The three coat-one bake method comprises coating a color base coating containing a pigment, dye and/or metal powder, then coating thereon a base coating containing a pigment, dye and/or metal powder without conducting the baking, then coating the resultant coatings with a clear coating or color clear coating containing a small amount of a pigment or dye to form a top coating and then finally baking them at a time. The three coat-two bake method comprises coating a color base coating containing a pigment, dye and/or metal powder, baking the resultant coating, then coating thereon a base coating containing a pigment, dye and/or metal powder, then coating resultant coating with a clear coating or color clear coating containing a small amount of a pigment or dye, to form a top coating and finally baking them.

In the two coat-one bake method, the coating composition (A) of the present invention is used as the base coating, and the coating composition (B) of the present invention is used as the clear coating or color clear coating to form the top coating. In the three coat-one bake method or three coat-two bake method, the coating composition (A) of the present invention is used as the color base coating. In this method, although the coating composition (A) of the present invention is usable as the base coating, an ordinary one-pack type coating containing melamine resin is also usable without any limitation. The top coating is formed with the coating composition (B) of the present invention as the clear coating or color clear coating.

The thickness of the coating of the coating composition (A) after drying is usually 10 to 30 $\mu$m, preferably 15 to 25 $\mu$m. On the other hand, the thickness of the coating of the coating composition (B) after drying is usually 20 to 40 $\mu$m, preferably 25 to 35 $\mu$m.

EXAMPLES

The following Preparation Examples, Examples and Comparative Examples will further illustrate the present invention. In these Examples, parts and percentages are given by weight.

Preparation Examples 1 to 29

Preparation of Grafted Chlorinated Polyolefin Resin Constituting the Coating Composition (A)

Preparation Example 1

According to Table 1 below, 744 parts of toluene and 500 parts of chlorinated polypropylene (Superchlon L-206 produced by Nippon Seishi K.K.; chlorine content: 32%, non-volatile matter content: 50%) were fed into a flask provided with a stirrer, cooling tube and thermometer. They were heated to 100° C. under stirring to obtain a homogeneous mixture. Then, a mixed liquid comprising 225 parts of cyclohexyl methacrylate, 12.8 parts of butyl acrylate, 113.2 parts of isobutyl methacrylate, 43.5 parts of 2-hydroxyethyl acrylate, 351.7 parts of Placcel FM-4 (a product of Daicel Ltd.), 3.8 parts of acrylic acid and 5 parts of benzoyl peroxide was dropped into the mixture for a period of 2 hours. After stirring at that temperature for one hour followed by cooling to 80° C., 1 part of azobisisobutyronitrile was added to the reaction mixture. The resultant mixture was stirred for 5 hours to obtain the grafted chlorinated polyolefin resin solution A constituting the coating composition (A). Table 1 shows the heating residue (%) of the grafted chlorinated polyolefin resin solution and the characteristics of the grafted chlorinated polyolefin resin, i.e. acid value, glass transition temperature (Tg) of the grafted part calculated according to Fox formula, amount of the chlorinated polyolefin/graft part, amount of a hydroxyl group at a position of 15 to 40 atoms distant from the main chain of the graft part, and the amount of the total hydroxyl groups in the graft part.

Grafted chlorinated polyolefin resin solutions B through ZC constituting the coating composition (A) were obtained according to Table 1 in the same manner as that of Preparation Example 1.

Preparation Examples 30 to 48

Preparation of Vinyl Polymer Resin Constituting the Coating Composition (B)

Preparation Example 30

According to Table 2, 800 parts of xylene was fed into a flask provided with a stirrer, cooling tube and thermometer. It was heated to 140° C. under stirring. Then, a mixed liquid comprising 36 parts of lauryl methacrylate, 460.8 parts of cyclohexyl methacrylate, 679.2 parts of Placcel FM-3 (a product of Daicel Ltd.), 24 parts of acrylic acid and 20 parts of t-butyl peroxybenzoate was dropped thereinto for a period of 2 hours. After stirring at that temperature for one hour, a mixture of 5 parts of t-butyl peroxybenzoate and 15 parts of xylene was dropped into the reaction mixture. The resultant mixture was stirred at that temperature for 2 hours to obtain the vinyl polymer resin solution A constituting the coating composition(B). Table 2 shows the heating residue (%) of the vinyl polymer resin solution and the characteristics of the vinyl polymer resin, i.e. the amount of primary hydroxyl groups (hereinafter referred to as "amount of specified hydroxyl groups") at a position of 15 to 40 atoms distant from the main chain, glass transition temperature (Tg) calculated according to Fox formula, amount of the total hydroxyl groups and acid value.

Vinyl polymer resin solutions B through S constituting the coating composition (B) were obtained according to Table 2 in the same manner as that of Preparation Example 30.

Example 1

Preparation of Coating Composition (A)

A coating composition (A-1) was prepared by thoroughly mixing a mixture of 100 parts of the grafted chlorinated polyolefin resin solution B, 43 parts of melamine resin (Uvan 60R produced by Mitsui Toatsu Chemicals, Inc.; isobutylated melamine resin of methylol type having weight average molecular weight of 7,000 and nonvolatile matter content of 50%), 11 parts of aluminum paste (SAP 510 produced by Showa Aluminum Corporation, having nonvolatile matter content of 65%) and 20 parts of butyl acetate with 0.1 part of Modaflow (surface controlling agent produced by Mitsubishi Monsanto Chemical Co.), 20 parts of n-butanol and 20 parts of xylene with Disper mill to obtain a coating composition (A-1) according to Table 3.

Preparation of Coating Composition (B)

A coating composition (B-1) was prepared by thoroughly mixing a mixture of 100 parts of the vinyl polymer resin solution B, 43 parts of melamine resin (Uvan 225 produced by Mitsui Toatsu Chemicals, Inc.; n-butylated melamine resin of imino type having nonvolatile matter content of 60%), 0.3 part of Modaflow, 1 part of Tinuvin 900 (benzotriazole ultraviolet absorber produced by Ciba-Geigy), 10 parts of butyl acetate, 20 parts of n-butanol and 10 parts of Solvesso 100 (aromatic hydrocarbon solvent produced by Exxon Corporation) with Disper mill to obtain a coating composition (B-1) according to Table 4.
(Coating of resin molding)

Test pieces having a size of 70×150 mm cut from an automobile bumber produced by molding a polyolefin resin (trade name: X-50; a product of Mitsui Petrochemical Industries, Ltd.) to be coatinged were degreased by wiping with isopropyl alcohol and then naturally dried. The coating composition (A-1) prepared as described above was diluted with a thinner comprising toluene and ethyl acetate in a weight ratio of 70/30 to a viscosity of 13 seconds (Ford cup #4, 20° C. ) and then air-sprayed to form a coating having a dry thickness of 20 μm. After flashing off for 3 minutes, the coating composition (B-1) prepared as described above and diluted with a thinner comprising xylene and butyl acetate in a weight ratio of 70/30 to a viscosity of 19 seconds (Ford cup #4, 20° C. ) was coated onto the coating by wet-on-wet state so that the dry thickness of the coating would be 30 μm. After leaving the test pieces to stand in the room for 10 minutes, they were dried by heating at 120° C. for 30 minutes. 24 hours after, the properties of the coating were examined.

The methods for testing the properties of the coatings were as described below. The test results are given in Table 5.
(Test methods for properties of coatings)
    (Finish appearance)
    The test pieces having an excellent glossy surface and free from serious roughness and also free from faults such as cissing, popping and floating passed the test.
    (Gloss of 60° mirror plane)
    The test pieces having a value of 90 or above according to JIS-K-5400 (1900) 7.6 passed the test.
    (Adhesion)
    Crosscut Cello-Tape tests were conducted according to JIS-K-5400 (1900) 8.5.2. The number of remaining squares for 100 squares was counted. The test pieces of 100/100 passed the test.
    (Gasoline resistance)
    A part of each test piece was immersed in a regular gasoline (a product of Nippon Oil Co., Ltd.) at 20° C. for 30 minutes. Then, the test piece was taken out, and the condition of the coating surface of the immersed part was observed and subjected to the adhesion test. The test pieces having no change in the condition of the coating surface passed the test. In the adhesion test, the test pieces having 100 squares remaining thereon for original 100 squares, i.e. those having 100/100, passed the test.
    (Acid resistance)
    0.2 ml of 0.1N sulfuric acid was dropped on the coating. After leaving the test pieces at 20° C. and 75% RH (relative humidity) for 24 hours, the test pieces were washed with water. The condition of the coating surface was observed and those having no change passed the test.
    (Alkali resistance)
    0.2 ml of 0.1N sodium hydroxide was dropped on the coating. After leaving the test pieces at 20° C. and 75% RH for 24 hours, the condition of the coating surface was observed and those having no change passed the test.
    (Water resistance)
    The test pieces were immersed in warm water having a temperature of 40° C. for 240 hours and then taken out. The condition of the coating surface was observed and the adhesion test was conducted. Those having no change in the condition of the coating passed the test. In the adhesion test, the test pieces having 100 squares remaining thereon for original 100 squares, i. e. those having 100/100, passed the test.
    (Impact resistance)
    A weight having a point of impact of ½ inch and weighing 500 g was dropped from a height of 30 cm with a Du Pont impact testing machine according to JIS-K-5400 (1990) 8. 3. 2. in a room at −20° C. The test pieces free from cracking and peeling off of the coating passed the test.
    (Weather resistance)
    The samples were tested with an accelerated weathering tester according to JIS-K-5400 (1990) 9. 8. 1 for 2,000 hours and then the gloss retention rate (%) of the 60° mirror plane [(glossiness after the test/initial glossiness)×100] was determined. Also the adhesion test was conducted. The samples having the gloss retention rate of 80% or higher and free from the color change passed the test. In the adhesion test, the test pieces having 100 squares remaining thereon for original 100 squares, i. e. those having 100/100, passed the test.

The details of the components given in Tables 1 through 4 given below are as follows:

Notes:
1) "superchlon L-206": chlorine content: 32%, and nonvolatile matter content: 50% (trade name of Nippon Seishi K.K.),
2) "Hardrene BS-40": chlorine content:- 40%, and nonvolatile matter content: 50% (trade name of Toyo Kasei Kogyo K.K.),
3) "Hardrene 14 LLB": chlorine content: 27%, and nonvolatile matter content: 15% (trade name of Toyo Kasei Kogyo K.K.),
4) "Placcel FM-2": a caprolactone-modified methacrylic ester having an average molecular weight of 358 and a hydroxyl value of 157 mgKOH/g (a product of Daicel Ltd.),
5) "Placcel FM-3": a caprolactone-modified methacrylic ester having an average molecular weight of 472 and a hydroxyl value of 119 mgKOH/g (a product of Daicel Ltd.),
6) "Placcel FM-4": a caprolactone-modified methacrylic ester having an average molecular weight of 586 and a hydroxyl value of 96 mgKOH/g (a product of Daicel Ltd.),
7) "Uvan 60 R": isobutylated melamine resin of methylol-type having a weight average molecular weight of 7,000 and a nonvolatile matter content of 50% (trade name of Mitsui Toatsu Chemicals, Inc.),
8) "Uvan 22 R": n-butylated melamine resin of imino-type having a weight average molecular weight of 7,000 and a nonvolatile matter content of 50% (trade name of Mitsui Toatsu Chemicals, Inc.),
9) "Uvan 21 R": n-butylated melamine resin of imino-type having a weight average molecular weight of 11,000 and a nonvolatile matter content of 50% (trade name of Mitsui Toatsu Chemicals, Inc.),
10) "Uvan 225": n-butylated melamine resin of imino-type having a weight average molecular weight of 2,000 and a nonvolatile matter content of 60% (trade name of Mitsui Toatsu Chemicals, Inc.),
11) Aluminum paste "SAP 510N": nonvolatile matter content: 65% (trade name of Showa Aluminum Corporation),
12) "Modaflow": acrylic copolymer used as the surface controlling agent and a having nonvolatile matter content of 100% (trade name of Mitsubishi Monsanto Chemical Co.),
13) "Catalyst 296-9": phosphoric ester having a nonvolatile matter content of 50% (trade name of Mitsui Cytec K.K.),
14) "Uvan 220": n-butylated melamine resin of imino-type having a nonvolatile matter content of 60% (trade name of Mitsui Toatsu Chemicals, Inc.),
15) "Uvan 166": isobutylated melamine resin of methylol-type having nonvolatile matter content of 60% (trade name of Mitsui Toatsu Chemicals, Inc.),
16) "Uvan 122": n-butylated melamine resin of methylol-type having a nonvolatile matter content of 60% (trade name of Mitsui Toatsu Chemicals, Inc.),
17) "Uvan 120": n-butylated melamine resin of complete alkoxy-type having a nonvolatile matter content of 96% (trade name of Mitsui Toatsu Chemicals, Inc.),
18) "Tinuvin 900": benzotriazole ultraviolet absorber of Ciba-Geigy,
19) "Catalyst 4040": aromatic sulfonic acid having nonvolatile matter content of 40% (trade name of Mitsui Cytec K.K.),
20) "Solvesso 100"aromatic hydrocarbon solvent of Exxon Corporation.
21) "Placcel FA-3": a caprotactone-modified acrylic ester having an average molecular weight of 458 and a hydroxy value of 122 mgKOH/g (a product of Daisei Ltd.)
22) "Placcel FA-2": a caprolactone-modified acrylic ester having and average molecular weight of 344 and a hydroxy value of 163 mgKOH/g(a product of Daisel Ltd.)

Examples 2 to 42 and Comparative Examples 1 to 18

The coating compositions (A) and (B) were prepared according to Tables 3 and 4 and then the coating compositions (A) and (B) were coated according to Table 5 in the same manner as that of Example 1. After drying by heating at a temperature given in Table 5 for 30 minutes, the coating property tests were conducted in the same manner as that described above. The results are given in Table 5.

TABLE 1

| Preparation Example | 1 | 2 | 3 | 4 |
|---|---|---|---|---|
| Grafted chlorinated polyolefin | (Reference) | | | |
| resin solution | A | B | C | D |
| Components for resin synthesis | | | | |
| Toluene | 744.0 | 744.0 | 744.0 | 744.0 |
| Chlorinated polypropylene Superchlon L-206, Note 1) | 500.0 | 500.0 | 500.0 | 500.0 |
| Vinyl-polymerizable monomer | | | | |
| Cyclohexyl methacrylate | 225.0 | 225.0 | 225.0 | 225.0 |
| Butyl acrylate | 12.8 | 15.8 | 17.3 | 19.5 |
| Isobutyl methacrylate | 113.2 | 101.2 | 93.0 | 84.0 |
| 2-Hydroxyethyl acrylate | 43.5 | 43.5 | 43.5 | 43.5 |
| Placcel FM-4, Note 6) | 351.7 | 351.7 | 351.7 | 351.7 |
| Acrylic acid | 3.8 | 12.8 | 19.5 | 26.3 |
| Polymerization initiator | | | | |
| Benzoyl peroxide | 5.0 | 5.0 | 5.0 | 5.0 |
| Azobisisobutyronitrile | 1.0 | 1.0 | 1.0 | 1.0 |
| Heatinq residue of resin solution (%) | 50 | 50 | 50 | 50 |
| Properties of resin | | | | |
| Acid value of resin (mgKoH/g) | 3.0 | 10.0 | 15.2 | 20.5 |
| Glass transition temp. of graft part (° C.) | 0 | 0 | 0 | 0 |
| Chlorinated polyolefin/graft part | 25/75 | 25/75 | 25/75 | 25/75 |
| Amount of specified hydroxyl group in graft part (mol/Kg resin)* | 0.8 | 0.8 | 0.8 | 0.8 |
| Total amount of hydroxyl groups in graft part (mol/Kg resin) | 1.3 | 1.3 | 1.3 | 1.3 |

| Preparation Example | 5 | 6 | 7 | 8 |
|---|---|---|---|---|
| Grafted chlorinated polyolefin | | | (Ref.) | (Ref.) |
| resin solution | E | F | G | H |
| Components for resin synthesis | | | | |
| Toluene | 744.0 | 744.0 | 744.0 | 744.0 |
| Chlorinated polypropylene Superchlon L-206, Note 1) | 500.0 | 500.0 | 500.0 | 500.0 |
| Vinyl-polymerizable monomer | | | | |
| Cyclohexyl methacrylate | 225.0 | 225.0 | 112.5 | 187.5 |
| Butyl acrylate | 21.0 | 24.8 | 146.2 | 81.0 |
| Isobutyl methacrylate | 77.3 | 60.0 | 15.0 | 5.2 |
| 2-Hydroxyethyl acrylate | 43.5 | 43.5 | | |
| Placcel FM-3, Note 5) | | | 460.5 | 460.5 |
| Placcel FM-4, Note 6) | 351.7 | 361.7 | | |
| Acrylic acid | 31.5 | 45.0 | 15.8 | 15.8 |
| Polymerization initiator | | | | |
| Benzoyl peroxide | 5.0 | 5.0 | 5.0 | 5.0 |
| Azobisisobutyronitrile | 1.0 | 1.0 | 1.0 | 1.0 |
| Heating residue of resin solution (%) | 50 | 50 | 50 | 50 |
| Properties of resin | | | | |
| Acid value of resin (mgKOH/g) | 24.5 | 35.1 | 12.3 | 12.3 |
| Glass transition temp. of | | | | |

TABLE 1-continued

| | | | | |
|---|---|---|---|---|
| graft part (° C.) | 0 | 0 | -25 | -25 |
| Chlorinated polyolefin/graft part | 25/75 | 25/75 | 25/75 | 25/75 |
| Amount of specified hydroxyl group in graft part (mol/Kg resin)* | 0.8 | 0.8 | 1.3 | 1.3 |
| Total amount of hydroxyl groups in graft part (mol/Kg resin) | 1.3 | 1.3 | 1.3 | 1.3 |

| Preparation Example | 9 | 10 | 11 |
|---|---|---|---|
| Grafted chlorinated polyolefin resin solution | I | J | K |
| Components for resin synthesis | | | |
| Toluene | 744.0 | 744.0 | 744.0 |
| Chlorinated polypropylene Superchlon L-206, Note 1) | 500.0 | 500.0 | 500.0 |
| Vinyl-polymerizable monomer | | | |
| Cyclohexyl methacrylate | 225.0 | 225.0 | 225.0 |
| Butyl acrylate | 15.0 | 39.7 | 18.0 |
| Isobutyl methacrylate | 33.7 | 120.7 | 233.2 |
| 2-Hydroxyethyl acrylate | | | 43.5 |
| Placcel FM-2, Note 4) | | 348.8 | 214.5 |
| Placcel FM-3, Note 5) | 460.5 | | |
| Acrylic acid | 15.8 | 15.8 | 15.8 |
| Polymerization initiator | | | |
| Benzoyl peroxide | 5.0 | 5.0 | 5.0 |
| Azobisisobutyronitrile | 1.0 | 1.0 | 1.0 |
| Heating residue of resin solution (%) | 50 | 50 | 50 |
| Properties of resin | | | |
| Acid value of resin (mgKOH/g) | 12.3 | 12.3 | 12.3 |
| Glass transition temp. of graft part (° C.) | -5 | 10 | 25 |
| Chlorinated polyolefin/graft part | 25/75 | 25/75 | 25/75 |
| Amount of specified hydroxyl group in graft part (mol/Kg resin)* | 1.3 | 1.3 | 0.8 |
| Total amount of hydroxyl groups in graft part (mol/Kg resin)* | 1.3 | 1.3 | 1.3 |

| Preparation Example | 12 | 13 | 14 | 15 |
|---|---|---|---|---|
| Grafted chlorinated polyolefin | | (Ref.) | (Ref.) | |
| resin solution | L | M | N | O |
| Components for resin synthesis | | | | |
| Toluene | 744.0 | 963.0 | 913.0 | 844.0 |
| Chlorinated polypropylene Superchlon L-206, Note 1) | 500.0 | 60.0 | 160.0 | 300.0 |
| Vinyl-polymerizable monomer | | | | |
| Cyclohexyl methacrylate | 300.0 | 291.0 | 276.0 | 255.0 |
| Butyl acrylate | 3.0 | 80.4 | 76.3 | 70.5 |
| Isobutyl methacrylate | 209.2 | 155.2 | 147.2 | 136.0 |
| 2-Hydroxyethyl acrylate | 60.7 | 56.3 | 53.4 | 49.3 |
| Placcel FM-2, Note 4) | 161.3 | | | |
| Placcel FM-3, Note 5) | | 366.7 | 347.8 | 321.3 |
| Acrylic acid | 15.8 | 20.4 | 19.3 | 17.9 |
| Polymerization initiator | | | | |
| Benzoyl peroxide | 5.0 | 6.0 | 6.0 | 5.0 |
| Azobisisobutyronitrile | 1.0 | 1.0 | 1.0 | 1.0 |
| Heating residue of resin solution (%) | 50 | 50 | 50 | 50 |
| Properties of resin | | | | |
| Acid value of resin (mgKOH/g) | 12.3 | 15.9 | 15.0 | 13.9 |
| Glass transition temp. of graft part (° C.) | 35 | 5 | 5 | 5 |
| Chlorinated polyolefin/graft part | 25/75 | 3/97 | 8/92 | 15/85 |
| Amount of specified hydroxyl group in graft part (mol/Kg resin)* | 0.6 | 0.8 | 0.8 | 0.8 |
| Total amount of hydroxyl groups in graft part (mol/Kg resin) | 1.3 | 1.3 | 1.3 | 1.3 |

| Preparation Example | 16 | 17 | 18 | 19 |
|---|---|---|---|---|
| Grafted chlorinated polyolefin resin solution | P | Q | R | S |
| Components for resin synthesis | | | | |
| Toluene | 844.0 | 144.0 | 794.0 | 694.0 |
| Chlorinated polypropylene | | | | |
| Superchlon L-206, Note 1) | | | 400.0 | 600.0 |
| Hardrene BS-40, Note 2) | 300.0 | | | |
| Hardrene 14 LLB, Note 3) | | 1000 | | |
| Vinyl-polymerizable monomer | | | | |
| Cyclohexyl methacrylate | 255.0 | 255.0 | 240.0 | 210.0 |
| Butyl acrylate | 70.5 | 70.5 | 66.4 | 58.1 |
| Isobutyl methacrylate | 136.0 | 136.0 | 128.0 | 112.0 |
| 2-Hydroxyethyl acrylate | 49.3 | 49.3 | 46.4 | 40.6 |
| Placcel FM-3, Note 5) | 321.3 | 321.3 | 302.4 | 264.6 |
| Acrylic acid | 17.9 | 17.9 | 16.8 | 14.7 |
| Polymerization initiator | | | | |
| Benzoyl peroxide | 5.0 | 5.0 | 5.0 | 5.0 |
| Azobisisobutyronitrile | 1.0 | 1.0 | 1.0 | 1.0 |
| Heating residue of resin solution (%) | 50 | 50 | 50 | 50 |
| Properties of resin | | | | |
| Acid value of resin (mgKOH/g) | 13.9 | 13.9 | 13.1 | 11.5 |
| Glass transition temp. of graft part (° C.) | 5 | 5 | 5 | 5 |
| Chlorinated polyolefin/graft part | 15/85 | 15/85 | 20/80 | 30/70 |
| Amount of specified hydroxyl group in graft part (mol/Kg resin)* | 0.8 | 0.8 | 0.8 | 0.8 |
| Total amount of hydroxyl groups in graft part (mol/Kg resin) | 1.3 | 1.3 | 1.3 | 1.3 |

| Preparation Example | 20 | 21 | 22 |
|---|---|---|---|
| Grafted chlorinated polyolefin | | (Ref.) | |
| resin solution | T | U | V |
| Components for resin synthesis | | | |
| Toluene | 595.0 | 446.0 | 744.0 |
| Chlorinated polypropylene Superchlon L-206, Note 1) | 800.0 | 1100 | 500.0 |
| Vinyl-polymerizable monomer | | | |
| Cyclohexyl methacrylate | 180.0 | 135.0 | 0 |
| Butyl acrylate | 49.8 | 37.3 | 15.8 |
| Isobutyl methacrylate | 96.0 | 72.0 | 323.2 |
| 2-Hydroxyethyl acrylate | 34.8 | 26.1 | 43.5 |
| Placcel FM-3, Note 5) | 226.8 | 170.1 | 0 |
| Placcel FM-4 | 0 | 0 | 351.7 |
| Acrylic acid | 12.6 | 9.5 | 15.8 |
| Polymerization initiator | | | |
| Benzoyl peroxide | 4.0 | 3.0 | 5.0 |
| Azobisisobutyronitrile | 1.0 | 1.0 | 1.0 |
| Heating residue of resin solution (%) | 50 | 50 | 50 |
| Properties of resin | | | |
| Acid value of resin (mgKOH/g) | 9.8 | 7.4 | 12.3 |
| Glass transition temp. of graft part (° C.) | 5 | 5 | 2 |
| Chlorinated polyolefin/graft part | 40/60 | 55/45 | 25/115 |
| Amount of specified hydroxyl group in graft part (mol/Kg resin)* | 0.8 | 0.8 | 0.8 |
| Total amount of hydroxyl groups in graft part (mol/Kg resin) | 1.3 | 1.3 | 1.3 |

| Preparation Example | 23 | 24 | 25 | 26 | 27 |
|---|---|---|---|---|---|
| Grafted chlorinated polyolefin resin solution | W | X | Y | Z | ZA |
| Components for resin synthesis | | | | | |
| Toluene | 744.0 | 744.0 | 744.0 | 744.0 | 744.0 |
| Chlorinated polypropylene | 500.0 | 500.0 | 500.0 | 500.0 | 500.0 |

TABLE 1-continued

| | | | | | |
|---|---|---|---|---|---|
| Superchlon L-206, Note 1) | | | | | |
| Vinyl-polymerizable monomer | | | | | |
| Cyclohexyl methacrylate | 50.0 | 339.0 | 390.0 | 484.2 | 497.1 |
| Butyl acrylate | 15.8 | 0 | 25.8 | 0 | 0 |
| Isobutyl methacrylate | 273.0 | 0 | 0 | 0 | 0 |
| 2-Hydroxyethyl acrylate | 43.5 | 43.5 | 43.5 | 43.5 | 43.5 |
| Placcel FM-4 | 351.7 | 351.7 | 0 | 0 | 0 |
| Placcel FM-2, Note 4) | 0 | 0 | 274.9 | 0 | 0 |
| Placcel FM-3, Note 5) | 0 | 0 | 0 | 206.5 | 193.6 |
| Acrylic acid | 15.8 | 15.8 | 15.8 | 15.8 | 15.8 |
| Polymerization initiator | | | | | |
| Benzoyl peroxide | 5.0 | 5.0 | 5.0 | 5.0 | 5.0 |
| Azobisisobutyronitrile | 1.0 | 1.0 | 1.0 | 1.0 | 1.0 |
| Heating residue of resin solution (%) | 50 | 50 | 50 | 50 | 50 |
| Properties of resin | | | | | |
| Acid value of resin (mgKOH/g) | 12.3 | 12.3 | 12.3 | 12.3 | 12.3 |
| Glass transition temp. of graft part (° C.) | 2 | 2 | 7 | 25 | 27 |
| Chlorinated polyolefin/graft part | | | | | |
| Amount of specified hydroxyl group in graft part (mol/Kg resin)* | 25/75 | 25/75 | 25/75 | 25/75 | 25/75 |
| Total amount hydroxyl groups in graft part (mol/Kg resin) | 0.8 1.3 | 0.8 1.3 | 0.8 1.3 | 0.8 1.3 | 0.75 1.25 |

| | | |
|---|---|---|
| Preparation Example | 28 | 29 |
| Grafted chlorinated polyolefin resin solution | ZB | ZC |
| Components for resin synthesis | | |
| Toluene | 744.0 | 744.0 |
| Chlorinated polypropylene Superchlon L-206, Note 1) | 500.0 | 500.0 |
| Vinyl-polymerizable monomer | | |
| Isobornyl methacrylate | 339.0 | 225.0 |
| Butyl acrylate | 0 | 14.0 |
| Isobutyl methacrylate | 0 | 100.0 |
| 2-Hydroxyethyl acrylate | 43.5 | 43.5 |
| Placcel FM-4 | 351.7 | 351.7 |
| Acrylic acid | 15.8 | 15.8 |
| Polymerization initiator | | |
| Benzoyl peroxide | 5.0 | 5.0 |
| Azobisisobutyronitrile | 1.0 | 1.0 |
| Heating residue of resin solution (%) | 50 | 50 |
| Properties of resin | | |
| Acid value of resin (mgKOH/g) | 12.3 | 12.3 |
| Glass transition temp. of graft part (° C.) | 28 | 17 |
| Chlorinated polyolefin/graft part | | |
| Amount of specified hydroxyl group in graft part (mol/Kg resin)* | 25/75 | 25/75 |
| Total amount hydroxyl groups in graft part (mol/Kg resin) | 0.8 1.3 | 0.8 1.3 |

Note)
*Amount of hydroxyl groups at a position of 15 to 40 atoms distant from the main chain of the graft part (the same shall apply hereinafter).

TABLE 2

| Preparation Example | 30 | 31 | 32 | 33 |
|---|---|---|---|---|
| Vinyl polymer resin solution | A | B | C | D |
| Components for resin systhesis | (Ref.) | | | |
| Xylene | 800.0 | 800.0 | 800.0 | 800.0 |
| Vinyl-polymerizable monomer | | | | |
| Lauryl methacrylate | | 36.0 | 120.0 | 240.0 |
| 2-Ethylhexyl methacrylate | | | | 240.0 |
| Cyclohexyl methacrylate | 460.8 | | | |
| Styrene | | | 376.8 | |
| Tetracyclodecyl acrylate | | 369.6 | | |
| Isobornyl acrylate | | | 256.8 | |
| Placcel FM-3 | 679.2 | 679.2 | 566.4 | 679.2 |
| Acrylic acid | 24.0 | 24.0 | 24.0 | 24.0 |
| Polymerization initiator | | | | |
| t-Butyl peroxybenzoate | 20.0 | 20.0 | 20.0 | 20.0 |
| t-Butyl peroxybenzoate | 5.0 | 5.0 | 5.0 | 5.0 |
| Xylene | 15.0 | 15.0 | 15.0 | 15.0 |
| Heating residue of resin solution (%) | 60 | 60 | 60 | 60 |
| Properties of resin | | | | |
| Amount of (meth)acrylate monomer having carbon chain of 6 to 18 atoms (%) | 3.0 | 10.0 | 20.0 | 20.0 |
| Amount of specified hydroxyl group (mol/Kg resin)* | 1.2 | 1.2 | 1.0 | 1.2 |
| Glass transition temp. (°C.) | −1 | −8 | −10 | −10 |
| Total amount of hydroxyl groups (mol/Kg resin) | 1.2 | 1.2 | 1.0 | 1.2 |
| Acid value (mg KOH/g) | 15.6 | 15.6 | 15.6 | 15.6 |

| Preparation Example | 34 | 35 | 36 | 37 |
|---|---|---|---|---|
| 6inyl polymer resin solution | E | F | G | H |
| Components for resin synthesis | | (Ref.) | (Ref.) | |
| Xylene | 800.0 | 800.0 | 800.0 | 800.0 |
| Vinyl-polymerizable monomer | | | | |
| Lauryl methacrylate | | | 420.0 | 240.0 |
| 2-Ethylhexyl methacrylate | 420.0 | 504.0 | | |
| Cyclohexyl methacrylate | | | 568.8 | 240.0 |
| Styrene | | | | 180.0 |
| Tetracyclododecyl acrylate | 189.0 | 105.6 | | |
| 2-Hydroxyethyl methacrylate | | | 187.2 | |
| Placcel FM-2 | | | | 516.0 |
| Placcel FM-3 | 566.4 | 566.4 | | |
| Acrylic acid | 24.0 | 24.0 | 24.0 | 24.0 |
| Polymerization initiator | | | | |
| t-Butyl peroxybenzoate | 20.0 | 20.0 | 20.0 | 20.0 |
| t-Butyl peroxybenzoate | 5.0 | 5.0 | 5.0 | 5.0 |
| Xylene | 15.0 | 15.0 | 15.0 | 15.0 |
| Heating residue of resin solution (%) | 60 | 60 | 60 | 60 |
| Properties of resin | | | | |
| Amount of (meth)acrylate monomer having carbon chain of 6 to 18 atoms (%) | 35.0 | 42.0 | 35.0 | 20.0 |
| Amount of specified hydroxyl group (mol/Kg resin)* | 1.0 | 1.0 | 0 | 1.2 |
| Glass transition temp. (°C.) | −9 | −15 | 9 | −5 |
| Total amount of hydroxyl groups (mol/kg resin) | 1.0 | 1.0 | 1.2 | 1.2 |
| Acid value (mg KOH/g) | 15.6 | 15.6 | 15.6 | 15.6 |

| Preparation Example | 38 | 39 | 40 |
|---|---|---|---|
| Vinyl polymer resin solution | I | J | K |
| Components for resin synthesis | (Ref.) | (Ref.) | |
| Xylene | 800.0 | 800.0 | 800.0 |
| Vinyl-polymerizable monomer | | | |
| Lauryl methacrylate | 180.0 | 180.0 | 180.0 |
| Cyclohexyl methacrylate | 240.0 | 240.0 | 240.0 |
| Styrene | 68.4 | 360.0 | 189.6 |
| Placcel FM-2 | 687.6 | | |
| Placcel FM-3 | | 396.0 | 566.4 |
| Acrylic acid | 24.0 | 24.0 | 24.0 |
| Polymerization initiator | | | |
| t-Butyl peroxybenzoate | 20.0 | 20.0 | 20.0 |
| t-Butyl peroxybenzoate | 5.0 | 5.0 | 5.0 |
| Xylene | 15.0 | 15.0 | 15.0 |
| Heating residue of resin solution (%) | 60 | 60 | 60 |
| Properties of resin | | | |
| Amount of (meth)acrylate monomer having carbon chain of 6 to 18 atoms (%) | 15.0 | 15.0 | 15.0 |
| Amount of specified hydroxyl group (mol/Kg resin)* | 1.6 | 0.7 | 1.0 |

TABLE 2-continued

| | | | | |
|---|---|---|---|---|
| Glass transition temp. (°C.) | −12 | 9 | −7 | |
| Total amount of hydroxyl groups (mol/Kg resin) | 1.6 | 0.7 | 1.0 | |
| Acid value (mg KOH/g) | 15.6 | 15.6 | 15.6 | |
| Preparation Example | 41 | 42 | 43 | 44 |
| Vinyl polymer resin solution | L | M | N | O |
| Components for resin synthesis | | | (Ref.) | |
| Xylene | 800.0 | 800.0 | 800.0 | 800.0 |
| Vinyl-polymerizable monomer | | | | |
| Lauryl methacrylate | | | 219.6 | 151.2 |
| 2-Ethylhexyl methacrylate | 240.0 | 120.0 | | |
| Styrene | 256.8 | 352.8 | 277.2 | 345.6 |
| Placcel FM-3 | 679.2 | | 679.2 | 679.2 |
| Placcel FM-4 | | 703.2 | | |
| Acrylic acid | 24.0 | 24.0 | 24.0 | 24.0 |
| Polymerization initiator | | | | |
| t-Butyl peroxybenzoate | 20.0 | 20.0 | 20.0 | 20.0 |
| t-Butyl peroxybenzoate | 5.0 | 5.0 | 5.0 | 5.0 |
| Xylene | 15.0 | 15.0 | 15.0 | 15.0 |
| Heating residue of resin solution (%) | 60 | 60 | 60 | 60 |
| Properties of resin | | | | |
| Amount of (meth)acrylate monomer having carbon chain of 6 to 18 atoms (%) | 20.0 | 10.0 | 18.3 | 12.6 |
| Amount of specified hydroxyl group (mol/Kg resin)* | 1.2 | 1.0 | 1.2 | 1.2 |
| Glass transition temp. (°C.) | −9 | −8 | −20 | −12 |
| Total amount of hydroxyl groups (mol/Kg resin) | 1.0 | 1.0 | 1.2 | 1.2 |
| Acid value (mg KOH/g) | 15.6 | 15.6 | 15.6 | 15.6 |
| Preparation Example | 45 | 46 | 47 | 48 |
| Vinyl polymer resin solution | P | Q | R | S |
| Components for resin synthesis | | | | (Ref.) |
| Xylene | 800.0 | 800.0 | 800.0 | 800.0 |
| Vinyl-polymerizable monomer | | | | |
| Lauryl methacrylate | 94.8 | | | |
| 2-Ethylhexyl methacrylate | | 405.6 | 307.2 | 201.6 |
| Styrene | 402.0 | 254.4 | 352.8 | 458.4 |
| Placcel FM-2 | | 516.0 | 516.0 | 516.0 |
| Placcel FM-3 | 679.2 | | | |
| Acrylic acid | 24.0 | 24.0 | 24.0 | 24.0 |
| Polymerization initiator | | | | |
| t-Butyl peroxybenzoate | 20.0 | 20.0 | 20.0 | 20.0 |
| t-Butyl peroxybenzoate | 5.0 | 5.0 | 5.0 | 5.0 |
| Xylene | 15.0 | 15.0 | 15.0 | 15.0 |
| Heating residue of resin solution (%) | 60 | 60 | 60 | 60 |
| Properties of resin | | | | |
| Amount of (meth)acrylate monomer having carbon chain of 6 to 18 atoms (%) | 7.9 | 33.8 | 25.6 | 16.8 |
| Amount of specified hydroxyl group (mol/Kg resin)* | 1.2 | 1.2 | 1.2 | 1.2 |
| Glass transition temp. (°C.) | −5 | 0 | 7 | 15 |
| Total amount of hydroxyl groups (mol/Kg resin) | 1.2 | 1.2 | 1.2 | 1.2 |
| Acid value (mg KOH/g) | 15.6 | 15.6 | 15.6 | 15.6 |

TABLE 3

| Coating composition (A) | | | A-1 | A-2 | A-3 |
|---|---|---|---|---|---|
| Components | | | | | |
| Grafted chlorinated polyolefin resin solution | Kind | | B | C | D |
| | Amount | | 100 | 100 | 100 |
| Melamine resin | | | | | |
| Uvan 60R (Note 7) | | | 43 | 43 | 43 |

TABLE 3-continued

| Aluminum paste (Note 11) | | | 11 | 11 | 11 |
|---|---|---|---|---|---|
| Butyl acetate | | | 20 | 20 | 20 |
| Modaflow (Note 12) | | | 0.1 | 0.1 | 0.1 |
| n-Butanol | | | 20 | 20 | 20 |
| Xylene | | | 20 | 20 | 20 |
| Properties | | | | | |
| Grafted chlorinated polyolefin resin/melamine resin | | | 70/30 | 70/30 | 70/30 |
| Coating composition (A) | | | A-4 | A-5 | A-6 |
| Components | | | | | |
| Grafted chlorinated polyolefin resin solution | Kind | | E | H | I |
| | Amount | | 100 | 100 | 100 |
| Melamine resin | | | | | |
| Uvan 60R (Note 7) | | | 43 | 43 | 43 |
| Aluminum paste (Note 11) | | | 11 | 11 | 11 |
| Butyl acetate | | | 20 | 20 | 20 |
| Modaflow (Note 12) | | | 0.1 | 0.1 | 0.1 |
| n-Butanol | | | 20 | 20 | 20 |
| Xylene | | | 20 | 20 | 20 |
| Properties | | | | | |
| Grafted chlorinated polyolefin resin/melamine resin | | | 70/30 | 70/30 | 70/30 |

| Coating composition (A) | | A-7 | A-8 | A-9 | A-10 | A-11 |
|---|---|---|---|---|---|---|
| Components | | | | | | |
| Grafted chlorinated polyolefin resin solution | Kind | J | K | N | O | P |
| | Amount | 100 | 100 | 100 | 100 | 100 |
| Melamine resin | | | | | | |
| Uvan 60R (Note 7) | | 43 | 43 | 43 | 43 | 43 |
| Aluminum paste (Note 11) | | 11 | 11 | 11 | 11 | 11 |
| Butyl acetate | | 20 | 20 | 20 | 20 | 20 |
| Modaflow (Note 12) | | 0.1 | 0.1 | 0.1 | 0.1 | 0.1 |
| n-Butanol | | 20 | 20 | 20 | 20 | 20 |
| Xylene | | 20 | 20 | 20 | 20 | 20 |
| Properties | | | | | | |
| Grafted chlorinated polyolefin resin/melamine resin | | 70/30 | 70/30 | 70/30 | 70/30 | 70/30 |

| Coating composition (A) | | A-12 | A-13 | A-14 |
|---|---|---|---|---|
| Components | | | | |
| Grafted chlorinated polyolefin resin solution | Kind | Q | R | S |
| | Amount | 100 | 100 | 100 |
| Melamine resin | | | | |
| Uvan 60R (Note 7) | | 43 | 43 | 43 |
| Aluminum paste (Note 11) | | 11 | 11 | 11 |
| Butyl acetate | | 20 | 20 | 20 |
| Modaflow (Note 12) | | 0.1 | 0.1 | 0.1 |
| n-Butanol | | 20 | 20 | 20 |
| Xylene | | 20 | 20 | 20 |
| Properties | | | | |
| Grafted chlorinated polyolefin resin/melamine resin | | 70/30 | 70/30 | 70/30 |

| Coating composition (A) | | A-15 | A-16 | A-17 |
|---|---|---|---|---|
| Components | | | | |
| Grafted chlorinated polyolefin resin solution | Kind | T | B | B |
| | Amount | 100 | 100 | 100 |
| Melamine resin | | | | |
| Uvan 60R (Note 7) | | 43 | | |
| Uvan 22R (Note 8) | | | 43 | |
| Uvan 21R (Note 9) | | | | 43 |
| Aluminum paste (Note 11) | | 11 | 11 | 11 |

TABLE 3-continued

| | | A-18 | A-19 | A-20 | A-21 | A-22 |
|---|---|---|---|---|---|---|
| Butyl acetate | | 20 | 20 | 20 | | |
| Modaflow (Note 12) | | 0.1 | 0.1 | 0.1 | | |
| n-Butanol | | 20 | 20 | 20 | | |
| Xylene | | 20 | 20 | 20 | | |
| Properties | | | | | | |
| Grafted chlorinated polyolefin resin/ melamine resin | | 70/30 | 70/30 | 70/30 | | |

| Coating composition (A) | | A-18 | A-19 | A-20 | A-21 | A-22 |
|---|---|---|---|---|---|---|
| Components | | | | | | |
| Grafted chlorinated polyolefin resin solution | Kind<br>Amount | B<br>100 | B<br>100 | B<br>100 | B<br>100 | B<br>100 |
| Melamine resin | | | | | | |
| Uvan 60R (Note 7) | | 100 | 67 | 25 | 11 | 43 |
| Aluminum paste (Note 11) | | 15 | 13 | 10 | 9 | 11 |
| Butyl acetate | | 20 | 20 | 20 | 20 | 20 |
| Modaflow (Note 12) | | 0.1 | 0.1 | 0.1 | 0.1 | 0.1 |
| Catalyst 296-9 (Note 13) | | | | | | 1 |
| n-Butanol | | 20 | 20 | 20 | 20 | 20 |
| Xylene | | 20 | 20 | 20 | 20 | 20 |
| Properties | | | | | | |
| Grafted chlorinated polyolefin resin/ melamine resin | | 50/50 | 60/40 | 80/20 | 90/10 | 70/30 |

| Coating composition (A) | | A-23 | A-24 | A-25 |
|---|---|---|---|---|
| Components | | (Referential Examples) | | |
| Grafted chlorinated polyolefin resin solution | Kind<br>Amount | B<br>100 | B<br>100 | B<br>100 |
| Melamine resin | | | | |
| Uvan 60R (Note 7) | | | 185 | 5 |
| Uvan 225 (Note 10) | | 36 | | |
| Aluminum paste (Note 11) | | 11 | 22 | 8 |
| Butyl acetate | | 20 | 20 | 20 |
| Modaflow (Note 12) | | 0.1 | 0.1 | 0.1 |
| n-Butanol | | 20 | 20 | 20 |
| Xylene | | 20 | 20 | 20 |
| Properties | | | | |
| Grafted chlorinated polyolefin resin/ melamine resin | | 70/30 | 35/65 | 95/5 |

| Coating composition (A) | | A-26 | A-27 | A-28 |
|---|---|---|---|---|
| Components | | (Referential Examples) | | |
| Grafted chlorinated polyolefin resin solution | Kind<br>Amount | A<br>100 | F<br>100 | G<br>100 |
| Melamine resin | | | | |
| Uvan 60R (Note 7) | | 43 | 43 | 43 |
| Uvan 225 (Note 10) | | | | |
| Aluminum paste (Note 11) | | 11 | 11 | 11 |
| Butyl acetate | | 20 | 20 | 20 |
| Modaflow (Note 12) | | 0.1 | 0.1 | 0.1 |
| n-Butanol | | 20 | 20 | 20 |
| Xylene | | 20 | 20 | 20 |
| Properties | | | | |
| Grafted chlorinated polyolefin resin/ melamine resin | | 70/30 | 70/30 | 70/30 |

| Coating composition (A) | | A-29 | A-30 | A-31 | A-32 |
|---|---|---|---|---|---|
| Components of paint | | (Referential Examples) | | | |
| Grafted chlorinated polyolefin resin solution | Kind<br>Amount | L<br>100 | M<br>100 | U<br>100 | V<br>100 |
| Melamine resin | | | | | |
| Uvan 60R (Note 7) | | 43 | 43 | 43 | 43 |
| Aluminum paste (Note 11) | | 11 | 11 | 11 | 11 |
| Butyl acetate | | 20 | 20 | 20 | 20 |
| Modaflow (Note 12) | | 0.1 | 0.1 | 0.1 | 0.1 |
| n-Butanol | | 20 | 20 | 20 | 20 |
| Xylene | | 20 | 20 | 20 | 20 |
| Properties of paint | | | | | |
| Grafted chlorinated polyolefin resin/ melamine resin | | 70/30 | 70/30 | 70/30 | 70/30 |

| Coating composition (A) | | A-33 | A-34 | A-35 | A-36 | A-37 |
|---|---|---|---|---|---|---|
| Components | | | | | | |
| Grafted chlorinated polyolefin resin solution | Kind<br>Amount | W<br>100 | X<br>100 | Y<br>100 | Z<br>100 | ZA<br>100 |
| Melamine resin | | | | | | |
| Uvan 60R (Note 7) | | 43 | 43 | 43 | 43 | 43 |
| Aluminum paste (Note 11) | | 11 | 11 | 11 | 11 | 11 |
| Butyl acetate | | 20 | 20 | 20 | 20 | 20 |
| Modaflow (Note 12) | | 0.1 | 0.1 | 0.1 | 0.1 | 0.1 |
| n-Butanol | | 20 | 20 | 20 | 20 | 20 |
| Xylene | | 20 | 20 | 20 | 20 | 20 |
| Properties | | | | | | |
| Grafted chlorinated polyolefin resin/ melamine resin | | 70/30 | 70/30 | 70/30 | 70/30 | 70/30 |

| Coating composition (A) | | A-38 | A-39 |
|---|---|---|---|
| Components | | | |
| Grafted chlorinated polyolefin resin solution | Kind<br>Amount | ZB<br>100 | ZC<br>100 |
| Melamine resin | | | |
| Uvan 60R (Note 7) | | 43 | 43 |
| Aluminum paste (Note 11) | | 11 | 11 |
| Butyl acetate | | 20 | 20 |
| Modaflow (Note 12) | | 0.1 | 0.1 |
| n-Butanol | | 20 | 20 |
| Xylene | | 20 | 20 |
| Properties | | | |
| Grafted chlorinated polyolefin resin/ melanine resin | | 70/30 | 70/30 |

TABLE 4

| Coating composition (B) | | B-1 | B-2 | B-3 |
|---|---|---|---|---|
| Components | | | | |
| Vinyl polymer resin solution | Kind<br>Amount | B<br>100 | C<br>100 | D<br>100 |
| Melamine resin | | 43 | 43 | 43 |
| Uvan 225 | | | | |
| Modaflow | | 0.3 | 0.3 | 0.3 |
| Tinuvin 900 (Note 18) | | 1 | 1 | 1 |
| Butyl acetate | | 10 | 10 | 10 |
| n-Butanol | | 20 | 20 | 20 |
| Solvesso 100 (Note 20) | | 10 | 10 | 10 |
| Properties | | | | |
| Vinyl polymer resin/ melamine resin | | 70/30 | 70/30 | 70/30 |

| Coating composition (B) | | B-1 | B-2 | B-3 |
|---|---|---|---|---|
| Components | | | | |
| Vinyl polymer resin solution | Kind<br>Amount | B<br>100 | C<br>100 | D<br>100 |
| Melamine resin | | 43 | 43 | 43 |

TABLE 4-continued

| Coating composition (B) | B-4 | B-5 | B-6 |
|---|---|---|---|
| Components | | | |
| Uvan 225 | | | |
| Modaflow | 0.3 | 0.3 | 0.3 |
| Tinuvin 909 (Note 18) | 1 | 1 | 1 |
| Butyl acetate | 10 | 10 | 10 |
| n-Butanol | 20 | 20 | 20 |
| Solvesso 100 (Note 20) | 10 | 10 | 10 |
| Properties | | | |
| Vinyl polymer resin/melamine resin | 70/30 | 70/30 | 70/30 |

| Coating composition (B) | | B-7 | B-8 | B-9 |
|---|---|---|---|---|
| Components | | | | |
| Vinyl polymer resin solution | Kind | E | H | K |
| | Amount | 100 | 100 | 100 |
| Melamine resin | | 43 | 43 | 43 |
| Uvan 225 | | | | |
| Modaflow | | 0.3 | 0.3 | 0.3 |
| Tinuvin 900 (Note 18) | | 1 | 1 | 1 |
| Butyl acetate | | 10 | 10 | 10 |
| n-Butanol | | 20 | 20 | 20 |
| Solvesso 100 (Note 20) | | 10 | 10 | 10 |
| Properties | | | | |
| Vinyl polymer resin/melamine resin | | 70/30 | 70/30 | 70/30 |

| Coating composition (B) | | B-7 | B-8 | B-9 | B-10 | B-11 |
|---|---|---|---|---|---|---|
| Components | | | | | | |
| Vinyl polymer resin solution | Kind | L | M | O | P | Q |
| | Amount | 100 | 100 | 100 | 100 | 100 |
| Melamine resin | | 43 | 43 | 43 | 43 | 43 |
| Uvan 225 | | | | | | |
| Modaflow | | 0.3 | 0.3 | 0.3 | 0.3 | 0.3 |
| Tinuvin 900 (Note 18) | | 1 | 1 | 1 | 1 | 1 |
| Butyl acetate | | 10 | 10 | 10 | 10 | 10 |
| n-Butanol | | 20 | 20 | 20 | 20 | 20 |
| Solvesso 100 (Note 20) | | 10 | 10 | 10 | 10 | 10 |
| Properties | | | | | | |
| Vinyl polymer resin/melamine resin | | 70/30 | 70/30 | 70/30 | 70/30 | 70/30 |

| Coating composition (B) | | B-12 | B-13 | B-14 |
|---|---|---|---|---|
| Components | | | | |
| Vinyl polymer resin solution | Kind | R | B | B |
| | Amount | 100 | 100 | 100 |
| Melamine resin | | | | |
| Uvan 225 | | 43 | | |
| Uvan 220 (Note 14) | | | 43 | |
| Uvan 166 (Note 15) | | | | 43 |
| Modaflow | | 0.3 | 0.3 | 0.3 |
| Tinuvin 900 (Note 18) | | 1 | 1 | 1 |
| Butyl acetate | | 10 | 10 | 10 |
| n-Butanol | | 20 | 20 | 20 |
| Solvesso 100 (Note 20) | | 10 | 10 | 10 |
| Properties | | | | |
| Vinyl polymer resin/melamine resin | | 70/30 | 70/30 | 70/30 |

| Coating composition (B) | | B-15 | B-16 | B-17 |
|---|---|---|---|---|
| Components | | | | |
| Vinyl polymer resin solution | Kind | B | B | B |
| | Amount | 100 | 100 | 100 |
| Melamine resin | | | | |
| Uvan 225 | | | 82 | 25 |
| Uvan 122 (Note 16) | | 43 | | |
| Modaflow | | 0.3 | 0.3 | 0.3 |
| Tinuvin 900 (Note 18) | | 1 | 1 | 1 |
| Butyl acetate | | 10 | 10 | 10 |
| n-Butanol | | 20 | 20 | 20 |
| Solvesso 100 (Note 20) | | 10 | 10 | 10 |
| Properties | | | | |
| Vinyl polymer resin/melamine resin | | 70/30 | 55/45 | 80/20 |

| Coating composition (B) | | B-18 | B-19 | B-20 |
|---|---|---|---|---|
| Components | | | | |
| Vinyl polymer resin solution | Kind | B | B | B |
| | Amount | 100 | 100 | 100 |
| Melamine resin | | | | |
| Uvan 225 | | 11 | 43 | |
| Uvan 120 (Note 17) | | | | 22 |
| Modaflow | | 0.3 | 0.3 | 0.3 |
| Tinuvin 900 (Note 18) | | 1 | 1 | 1 |
| Catalyst 296-9 | | | 1 | |
| Catalyst 4040 (Note 19) | | | | 1 |
| Butyl acetate | | 10 | 10 | 10 |
| n-Butanol | | 20 | 20 | 20 |
| Solvesso 100 (Note 20) | | 10 | 10 | 10 |
| Properties | | | | |
| Vinyl polymer resin/melamine resin | | 70/30 | 70/30 | 70/30 |

| Coating composition (B) | | B-21 | B-22 | B-23 |
|---|---|---|---|---|
| Components | | (Referential Examples) | | |
| Vinyl polymer resin solution | Kind | B | B | A |
| | Amount | 100 | 100 | 100 |
| Melamine resin | | 122 | 5 | 43 |
| Uvan 225 | | | | |
| Modaflow | | 0.3 | 0.3 | 0.3 |
| Tinuvin 900 (Note 18) | | 1 | 1 | 1 |
| Butyl acetate | | 10 | 10 | 10 |
| n-Butanol | | 20 | 20 | 20 |
| Solvesso 100 (Note 20) | | 10 | 10 | 10 |
| Properties | | | | |
| Vinyl polymer resin/melamine resin | | 45/55 | 95/5 | 70/30 |

| Coating composition (B) | | B-24 | B-25 | B-26 |
|---|---|---|---|---|
| Components | | (Referential Examples) | | |
| Vinyl polymer resin solution | Kind | F | G | I |
| | Amount | 100 | 100 | 100 |
| Melamine resin | | 43 | 43 | 4.3 |
| Uvan 225 | | | | |
| Modaflow | | 0.3 | 0.3 | 0.3 |
| Tinuvin 900 (Note 18) | | 1 | 1 | 1 |
| Butyl acetate | | 10 | 10 | 10 |
| n-Butanol | | 20 | 20 | 20 |
| Solvesso 100 (Note 20) | | 10 | 10 | 10 |
| Properties | | | | |
| Vinyl polymer resin/melamine resint | | 70/30 | 70/30 | 70/30 |

| Coating composition (B) | | B-27 | B-28 | B-29 |
|---|---|---|---|---|
| Components | | (Referential Examples) | | |
| Vinyl polymer resin solution | Kind | J | N | S |
| | Amount | 100 | 100 | 100 |
| Melamine resin | | 43 | 43 | 43 |
| Uvan 225 | | | | |
| Modaflow | | 0.3 | 0.3 | 0.3 |
| Tinuvin 900 (Note 18) | | 1 | 1 | 1 |
| Butyl acetate | | 10 | 10 | 10 |
| n-Butanol | | 20 | 20 | 20 |

TABLE 4-continued

| | | | |
|---|---|---|---|
| Solvesso 100 (Note 20) | 10 | 10 | 10 |
| Properties | | | |
| Vinyl polymer resin/ melamine resin | 70/30 | 70/30 | 70/30 |

TABLE 5

| | Example | | | | |
|---|---|---|---|---|---|
| | 1 | 2 | 3 | 4 | 5 |
| Coating composition (A) | A-1 | A-2 | A-3 | A-4 | A-5 |
| Coating composition (B) | B-1 | B-1 | B-1 | B-1 | B-1 |
| Baking temperature (° C.) | 120 | 120 | 120 | 120 | 120 |
| Finish appearance | pass | pass | pass | pass | pass |
| 60° mirror plane gloss | pass | pass | pass | pass | pass |
| Adhesion | pass | pass | pass | pass | pass |
| Gasoline resistance | | | | | |
| Surface condition | pass | pass | pass | pass | pass |
| Adhesion | pass | pass | pass | pass | pass |
| Acid resistance | pass | pass | pass | pass | pass |
| Alkali resistance | pass | pass | pass | pass | pass |
| Water resistance | | | | | |
| Surface condition | pass | pass | pass | pass | pass |
| Adhesion | pass | pass | pass | pass | pass |
| Impact resistance | pass | pass | pass | pass | pass |
| Weather resistance | | | | | |
| Surface condition | pass | pass | pass | pass | pass |
| Adhesion | pass | pass | pass | pass | pass |

| | Example | | | | |
|---|---|---|---|---|---|
| | 6 | 7 | 8 | 9 | 10 |
| Coating composition (A) | A-6 | A-7 | A-8 | A-9 | A-10 |
| Coating composition (B) | B-1 | B-1 | B-1 | B-1 | B-1 |
| Baking temperature (° C.) | 120 | 120 | 120 | 120 | 120 |
| Finish appearance | pass | pass | pass | pass | pass |
| 60° mirror plane gloss | pass | pass | pass | pass | pass |
| Adhesion | pass | pass | pass | pass | pass |
| Gasoline resistance | | | | | |
| Surface condition | pass | pass | pass | pass | pass |
| Adhesion | pass | pass | pass | pass | pass |
| Acid resistance | pass | pass | pass | pass | pass |
| Alkali resistance | pass | pass | pass | pass | pass |
| Surface condition | pass | pass | pass | pass | pass |
| Adhesion | pass | pass | pass | pass | pass |
| Impact resistance | pass | pass | pass | pass | pass |
| Weather resistance | | | | | |
| Surface condition | pass | pass | pass | pass | pass |
| Adhesion | pass | pass | pass | pass | pass |

| | Example | | | | |
|---|---|---|---|---|---|
| | 11 | 12 | 13 | 14 | 15 |
| Coating composition (A) | A-11 | A-12 | A-13 | A-14 | A-15 |
| Coating composition (B) | B-1 | B-1 | B-1 | B-1 | B-1 |
| Baking temperature (° C.) | 120 | 120 | 120 | 120 | 120 |
| Finish appearance | pass | pass | pass | pass | pass |
| 60° mirror plane gloss | pass | pass | pass | pass | pass |
| Adhesion | pass | pass | pass | pass | pass |
| Gasoline resistance | | | | | |
| Surface condition | pass | pass | pass | pass | pass |
| Adhesion | pass | pass | pass | pass | pass |
| Acid resistance | pass | pass | pass | pass | pass |
| Alkali resistance | pass | pass | pass | pass | pass |

TABLE 5-continued

| | | | | | |
|---|---|---|---|---|---|
| Water resistance | | | | | |
| Surface condition | pass | pass | pass | pass | pass |
| Adhesion | pass | pass | pass | pass | pass |
| Impact resistance | pass | pass | pass | pass | pass |
| Weather resistance | | | | | |
| Surface condition | pass | pass | pass | pass | pass |
| Adhesion | pass | pass | pass | pass | pass |

| | Example | | | | |
|---|---|---|---|---|---|
| | 16 | 17 | 18 | 19 | 20 |
| Coating composition (A) | A-16 | A-17 | A-18 | A-19 | A-20 |
| Coating composition (B) | B-1 | B-1 | B-1 | B-1 | B-1 |
| Baking temperature (° C.) | 120 | 120 | 120 | 120 | 120 |
| Finish appearance | pass | pass | pass | pass | pass |
| 60° mirror plane gloss | pass | pass | pass | pass | pass |
| Adhesion | pass | pass | pass | pass | pass |
| Gasoline resistance | | | | | |
| Surface condition | pass | pass | pass | pass | pass |
| Adhesion | pass | pass | pass | pass | pass |
| Acid resistance | pass | pass | pass | pass | pass |
| Alkali resistance | pass | pass | pass | pass | pass |
| Water resistance | | | | | |
| Surface condition | pass | pass | pass | pass | pass |
| Adhesion | pass | pass | pass | pass | pass |
| Impact resistance | pass | pass | pass | pass | pass |
| Weather resistance | | | | | |
| Surface condition | pass | pass | pass | pass | pass |
| Adhesion | pass | pass | pass | pass | pass |

| | Example | | | | |
|---|---|---|---|---|---|
| | 21 | 22 | 23 | 24 | 25 |
| Coating composition (A) | A-21 | A-1 | A-1 | A-1 | A-1 |
| Coating composition (B) | B-1 | B-2 | B-3 | B-4 | B-5 |
| Baking temperature (° C.) | 120 | 120 | 120 | 120 | 120 |
| Finish appearance | pass | pass | pass | pass | pass |
| 60° C. mirror plane gloss | pass | pass | pass | pass | pass |
| Adhesion | pass | pass | pass | pass | pass |
| Gasoline resistance | | | | | |
| Surface condition | pass | pass | pass | pass | pass |
| Adhesion | pass | pass | pass | pass | pass |
| Acid resistance | pass | pass | pass | pass | pass |
| Alkali resistance | pass | pass | pass | pass | pass |
| Water resistance | | | | | |
| Surface condition | pass | pass | pass | pass | pass |
| Adhesion | pass | pass | pass | pass | pass |
| Impact resistance | pass | pass | pass | pass | pass |
| Weather resistance | | | | | |
| Surface condition | pass | pass | pass | pass | pass |
| Adhesion | pass | pass | pass | pass | pass |

| | Example | | | | |
|---|---|---|---|---|---|
| | 26 | 27 | 28 | 29 | 30 |
| Coating composition (A) | A-21 | A-1 | A-1 | A-1 | A-1 |
| Coating composition (B) | B-6 | B-7 | B-8 | B-9 | B-10 |
| Baking temperature (° C.) | 120 | 120 | 120 | 120 | 120 |
| Finish appearance | pass | pass | pass | pass | pass |
| 60° mirror plane gloss | pass | pass | pass | pass | pass |
| Adhesion | pass | pass | pass | pass | pass |
| Gasoline resistance | | | | | |
| Surface condition | pass | pass | pass | pass | pass |
| Adhesion | pass | pass | pass | pass | pass |

TABLE 5-continued

|  | | | | | |
|---|---|---|---|---|---|
| Acid resistance | pass | pass | pass | pass | pass |
| Alkali resistance | pass | pass | pass | pass | pass |
| Water resistance | | | | | |
| Surface condition | pass | pass | pass | pass | pass |
| Adhesion | pass | pass | pass | pass | pass |
| Impact resistance | pass | pass | pass | pass | pass |
| Weather resistance | | | | | |
| Surface condition | pass | pass | pass | pass | pass |
| Adhesion | pass | pass | pass | pass | pass |

|  | Example | | | | |
|---|---|---|---|---|---|
|  | 31 | 32 | 33 | 34 | 35 |
| Coating composition (A) | A-1 | A-1 | A-1 | A-1 | A-1 |
| Coating composition (B) | B-11 | B-12 | B-13 | B-14 | B-15 |
| Baking temperature (° C.) | 120 | 120 | 120 | 120 | 120 |
| Finish appearance | pass | pass | pass | pass | pass |
| 60° mirror plane gloss | pass | pass | pass | pass | pass |
| Adhesion | pass | pass | pass | pass | pass |
| Gasoline resistance | | | | | |
| Surface condition | pass | pass | pass | pass | pass |
| Adhesion | pass | pass | pass | pass | pass |
| Acid resistance | pass | pass | pass | pass | pass |
| Alkali resistance | pass | pass | pass | pass | pass |
| Water resistance | | | | | |
| Surface condition | pass | pass | pass | pass | pass |
| Adhesion | pass | pass | pass | pass | pass |
| Impact resistance | pass | pass | pass | pass | pass |
| Weather resistance | | | | | |
| Surface condition | pass | pass | pass | pass | pass |
| Adhesion | pass | pass | pass | pass | pass |

|  | Example | | | | |
|---|---|---|---|---|---|
|  | 36 | 37 | 38 | 39 | 40 |
| Coating composition (A) | A-1 | A-1 | A-1 | A-1 | A-1 |
| Coating composition (B) | B-16 | B-17 | B-18 | B-19 | B-20 |
| Baking temperature (° C.) | 120 | 120 | 120 | 120 | 120 |
| Finish appearance | pass | pass | pass | pass | pass |
| 60° mirror plane gloss | pass | pass | pass | pass | pass |
| Adhesion | pass | pass | pass | pass | pass |
| Gasoline resistance | | | | | |
| Surface condition | pass | pass | pass | pass | pass |
| Adhesion | pass | pass | pass | pass | pass |
| Acid resistance | pass | pass | pass | pass | pass |
| Alkali resistance | pass | pass | pass | pass | pass |
| Water resistance | | | | | |
| Surface condition | pass | pass | pass | pass | pass |
| Adhesion | pass | pass | pass | pass | pass |
| Impact resistance | pass | pass | pass | pass | pass |
| Weather resistance | | | | | |
| Surface condition | pass | pass | pass | pass | pass |
| Adhesion | pass | pass | pass | pass | pass |

|  | Example | | Comp. Example | | |
|---|---|---|---|---|---|
|  | 41 | 42 | 1 | 2 | 3 |
| Coating composition (A) | A-22 | A-22 | A-23 | A-24 | A-25 |
| Coating composition (B) | B-19 | B-20 | B-1 | B-1 | B-1 |
| Baking temperature (° C.) | 100 | 100 | 120 | 120 | 120 |
| Finish appearance | pass | pass | pass | pass | pass |
| 60° mirror plane gloss | pass | pass | pass | pass | pass |
| Adhesion | pass | pass | pass | pass | pass |
| Gasoline resistance | | | | | |
| Surface condition | pass | pass | pass | pass | swollen |
| Adhesion | pass | pass | pass | pass | pass |
| Acid resistance | pass | pass | pass | pass | pass |
| Alkali resistance | pass | pass | pass | pass | pass |
| Water resistance | | | | | |
| Surface condition | pass | pass | loss of gloss | pass | pass |
| Adhesion | pass | pass | pass | pass | pass |
| Impact resistance | pass | pass | pass | crack | pass |
| Weather resistance | | | | | |
| Surface condition | pass | pass | pass | pass | color change |
| Adhesion | pass | pass | pass | pass | pass |

|  | Comparative Example | | | | |
|---|---|---|---|---|---|
|  | 4 | 5 | 6 | 7 | 8 |
| Coating composition (A) | A-26 | A-27 | A-28 | A-29 | A-30 |
| Coating composition (B) | B-1 | B-1 | B-1 | B-1 | B-1 |
| Baking temperature (° C.) | 120 | 120 | 120 | 120 | 120 |
| Finish appearance | pass | pass | pass | pass | pass |
| 60° mirror plane gloss | pass | pass | pass | pass | pass |
| Adhesion | pass | pass | pass | pass | 98/100 |
| Gasoline resistance | | | | | |
| Surface condition | swollen | pass | swollen | pass | pass |
| Adhesion | pass | pass | pass | pass | 92/100 |
| Acid resistance | pass | pass | pass | pass | pass |
| Alkali resistance | pass | pass | pass | pass | pass |
| Water resistance | | | | | |
| Surface condition | loss of gloss | blister | loss of gloss | pass | blister |
| Adhesion | pass | pass | pass | pass | 90/100 |
| Impact resistance | pass | pass | pass | crack | pass |
| Weather resistance | | | | | |
| Surface condition | pass | pass | pass | pass | pass |
| Adhesion | pass | pass | pass | pass | 90/100 |

|  | Comparative Example | | | | |
|---|---|---|---|---|---|
|  | 9 | 10 | 11 | 12 | 13 |
| Coating composition (A) | A-31 | A-1 | A-1 | A-1 | A-1 |
| Coating composition (B) | B-1 | B-21 | B-22 | B-23 | B-24 |
| Baking temperature (° C.) | 120 | 120 | 120 | 120 | 120 |
| Finish appearance | pass | pass | pass | low gloss | pass |
| 60° mirror plane gloss | pass | pass | pass | fail | pass |
| Adhesion | pass | pass | pass | pass | pass |
| Gasoline resistance | | | | | |
| Surface condition | swollen | pass | swollen | pass | swollen |
| Adhesion | pass | pass | pass | pass | pass |
| Acid resistance | pass | pass | pass | pass | pass |
| Alkali resistance | pass | pass | pass | pass | pass |
| Water resistance | | | | | |
| Surface condition | pass | pass | pass | pass | pass |
| Adhesion | pass | pass | pass | pass | pass |
| Impact resistance | pass | crack | pass | pass | pass |
| Weather resistance | | | | | |
| Surface condition | color change | pass | loss of gloss | pass | pass |
| Adhesion | pass | pass | pass | pass | pass |

TABLE 5-continued

Comparative Example

|  | 14 | 15 | 16 | 17 | 18 |
|---|---|---|---|---|---|
| Coating composition (A) | A-1 | A-1 | A-1 | A-1 | A-1 |
| Coating composition (B) | B-25 | B-26 | B-27 | B-28 | B-29 |
| Baking temperature (° C.) | 120 | 120 | 120 | 120 | 120 |
| Finish appearance | pass | pass | pass | pass | pass |
| 60° mirror plane gloss | pass | pass | pass | pass | pass |
| Adhesion | pass | pass | pass | pass | pass |
| Gasoline resistance |  |  |  |  |  |
| Surface condition | swollen | swollen | swollen | swollen | pass |
| Adhesion | pass | pass | pass | pass | pass |
| Acid resistance | pass | pass | pass | pass | pass |
| Alkali resistance | pass | pass | pass | pass | pass |
| Water resistance |  |  |  |  |  |
| Surface condition | pass | loss of gloss | loss of gloss | loss of gloss | pass |
| Adhesion | pass | pass | pass | pass | pass |
| Impact resistance | pass | pass | pass | pass | crack |
| Weather resistance |  |  |  |  |  |
| Surface condition | pass | pass | pass | pass | pass |
| Adhesion | pass | pass | pass | pass | pass |

Example

|  | 43 | 44 | 45 | 46 | 47 |
|---|---|---|---|---|---|
| Coating composition (A) | A-33 | A-34 | A-35 | A-32 | A-36 |
| Coating composition (B) | B-1 | B-1 | B-1 | B-1 | B-1 |
| Baking temperature (° C.) | 120 | 120 | 120 | 120 | 120 |
| Finish appearance | pass | pass | pass | pass | pass |
| 60° C. mirror plane gloss | pass | pass | pass | pass | pass |
| Adhesion | pass | pass | pass | pass | pass |
| Gasoline resistance |  |  |  |  |  |
| Surface condition | pass | pass | pass | pass | pass |
| Adhesion | pass | pass | pass | pass | pass |
| Acid resistance | pass | pass | pass | pass | pass |
| Alkali resistance | pass | pass | pass | pass | pass |
| Water resistance |  |  |  |  |  |
| Surface condition | pass | pass | pass | pass | pass |
| Adhesion | pass | pass | pass | pass | pass |
| Impact resistance | pass | pass | pass | pass | pass |
| Weather resistance |  |  |  |  |  |
| Surface condition | pass | pass | pass | pass | pass |
| Adhesion | pass | pass | pass | pass | pass |

Example

|  | 48 | 49 | 50 |
|---|---|---|---|
| Coating composition (A) | A-37 | A-38 | A-39 |
| Coating composition (B) | B-1 | D-1 | B-1 |
| Baking temperature (° C.) | 120 | 120 | 120 |
| Finish appearance | pass | pass | pass |
| 60° C. mirror plane gloss | pass | pass | pass |
| Adhesion | pass | pass | pass |
| Gasoline resistance |  |  |  |
| Surface condition | pass | pass | pass |
| Adhesion | pass | pass | pass |
| Acid resistance | pass | pass | pass |
| Alkali resistance | pass | pass | pass |
| Water resistance |  |  |  |
| Surface condition | pass | pass | pass |
| Adhesion | pass | pass | pass |
| Impact resistance | pass | pass | pass |
| Weather resistance |  |  |  |
| Surface condition | pass | pass | pass |
| Adhesion | pass | pass | pass |

It is apparent from the results given above that when the coating composition of the present invention is directly coated to the polyolefin resin materials (Examples 1 to 50), it exhibits a high adhesion to the polyolefin resin materials and, in addition, the coated moldings having extremely excellent properties usually required of the top coatings such as weather resistance, gasoline resistance, acid resistance, alkali resistance, water resistance, impact resistance, and finish and appearance can be obtained.

On the contrary, in Comparative Example 1, the water resistance is reduced, since the weight average molecular weight of the melamine resin contained in the coating composition (A) is below 3,000.

In Comparative Example 2 wherein the amount of the grafted chlorinated polyolefin resin in the coating composition (A) is below 40%, the self-condensation reaction ratio of the melamine resin is increased to make the coating brittle and thereby to reduce the impact resistance. On the contrary, in Comparative Example 3 wherein the amount of the grafted chlorinated polyolefin resin in the coating composition (A) is above 90%, the crosslinking is insufficient to reduce the gasoline resistance and weather resistance.

In Comparative Example 4 wherein the acid value of the grafted chlorinated polyolefin resin in the coating composition (A) is below 5, the curing is insufficient and, therefore, the gasoline resistance and water resistance are poor. On the contrary, in Comparative Example 5 wherein the acid value of the grafted chlorinated polyolefin resin in the coating composition (A) is above 30, the water resistance is poor.

In Comparative Example 6 wherein the glass transition temperature of the graft part of the grafted chlorinated polyolefin resin in the coating composition (A) is below 20° C., the gasoline resistance and water resistance are poor. On the other hand, in Comparative Example 7 wherein the glass transition temperature of the grafted part of the graft chlorinated polyolefin resin in the coating composition (A) is above 30° C., the flexibility of the coating is poor to reduce the impact resistance.

In Comparative Example 8 wherein the amount of the chlorinated polyolefin in the grafted chlorinated polyolefin resin in the coating composition (A) is below 5% by weight, the adhesion, gasoline resistance, water resistance and weather resistance are poor. On the other hand, in Comparative Example 9 wherein the amount of the chlorinated polyolefin in the grafted chlorinated polyolefin resin in the coating composition (A) is above 50% by weight, the gasoline resistance and weather resistance are poor.

In Comparative Example 10 wherein the amount of the vinyl polymer resin in the coating composition (B) is below 50% by weight, the self-condensation reaction ratio of the melamine resin is increased to make the coating brittle and thereby to reduce the impact resistance. On the contrary, in Comparative Example 11 wherein the amount of the vinyl polymer resin in the coating composition (B) is above 90%, the crosslinking is insufficient to reduce the gasoline resistance and weather resistance.

In Comparative Example 12 wherein the amount of the (meth) acrylate monomer having a carbon chain of 6 to 18 atoms in the vinyl-polymerizable monomer constituting the vinyl polymer resin in the coating composition (B) is below 5% by weight, the separability of the coating composition (A) from the coating composition (B) is poor when the coating composition (A) is coated with the coating composition (B) to make the appearance, finish and 60° mirror plane gloss poor. On the contrary, in Comparative Example 13 wherein the amount of the (meth) acrylate monomer having a carbon chain of 6 to 18 atoms in the vinyl-polymerizable monomer constituting the vinyl polymer resin in the coating composition (B) is above 40% by weight, the gasoline resistance is poor.

In Comparative Example 14 wherein the positions of the hydroxyl groups in the vinyl polymer resin in the coating composition (B) are not distant from the main chain of the vinyl polymer resin by at least 15 atoms, the reactivity is low and the gasoline resistance is poor.

In Comparative Example 15 wherein the amount of the primary hydroxyl groups at a position of 15 to 40 atoms distant from the main chain part of the vinyl polymer resin in the coating composition (B) is more than 1.5 mol/Kg resin, the coating becomes too soft and the gasoline resistance and water resistance are poor. On the contrary, in Comparative Example 16 wherein the amount of the primary hydroxyl groups at a position of 15 to 40 atoms distant from the main chain part of the vinyl polymer resin in the coating composition (B) is less than 0.8 mol/Kg resin, the crosslinking is insufficient and the gasoline resistance and water resistance are poor.

In Comparative Example 17 wherein the glass transition temperature of the vinyl polymer resin in the coating composition (B) is below −15° C. the resultant coating is too soft and the gasoline resistance and water resistance are poor. On the contrary, in Comparative Example 18 wherein the glass transition temperature of the vinyl polymer resin in the coating composition (B) is above 10° C., the flexibility of the resultant coating is insufficient and the impact resistance is low.

In this case, when cyclohexyl (meth) acrylate or isobornyl (meth) acrylate is used in the base coat resin in an amount of, e.g., 3 to 70 wt. %, good results were obtained. For example, in Examples 43 (6.7% of cyclohexyl (meth) acrylate), 44 (45%), 45 (52%), 47 (65%) and 48(66%), the properties of the coatings including impact resistance passed the test. In particular, the impact resistance of the resultant coating excellent when cyclic (meth)acrylate is used as a comonomer of the base coating resin, and in such a case, crack was effectively prevented from generating in the coating.

The coating composition of the present invention can be directly coated to the surfaces of exterior parts of automobiles such as bumpers made from a polyolefin resin material. Further, it exhibits a high adhesion to the polyolefin resin materials and, in addition, the coated moldings having extremely excellent properties usually required of the top coatings such as weather resistance, gasoline resistance, acid resistance, alkali resistance, water resistance, impact resistance, and finish and appearance can be obtained.

What is claimed is:

1. A coating composition for coating polyolefin resin moldings, which comprises:
    (1) a vinyl polymer resin obtained by polymerizing 5 to 40% by weight of a hydroxyl group-containing (meth) acrylate monomer having a carbon chain derived from a linear or branched alcohol residue having 6 to 18 carbon atoms, and a vinyl-polymerizable monomer having a primary hydroxyl group at a position 15 to 40 atoms distant from the vinyl group prepared by reacting a vinyl-polymerizable monomer having a hydroxyl group at a position 2–12 atoms distant from the vinyl group with a lactone, the vinyl polymer resin containing 0.8 to 1.5 mol/Kg-resin of primary hydroxyl groups in positions 15 to 40 atoms distant from the main chain of the vinyl polymer resin and having a calculated glass transition temperature of −15 to 10° C., and
    (2) a methylol melamine resin, a complete alkoxy group-containing melamine resin, or an imino group-containing melamine resin
    wherein the amount of said vinyl polymer resin (1) is 50 to 90% by weight and that of the melamine resin (2) is 50 to 10% by weight on said vinyl polymer resin (1) and said melamine resin (2).

2. The coating composition of claim 1 wherein said (meth)acrylate monomer is derived from a (meth)acrylate monomer having the following formula:

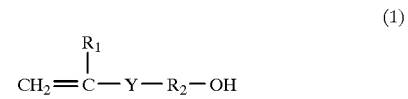

wherein $R^1$ represents a hydrogen atom or a methyl group, Y represents —COO—, a single bond or —O—, and $R^2$ represents an alkylene group having 13 to 38 carbon atoms.

3. The resin composition of claim 1 wherein said vinyl-polymerizable monomer is represented by the following formula:

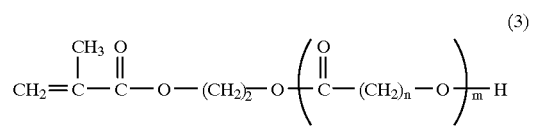

wherein n represents a number of 2 to 7 and m represents a number of 1 to 10.

* * * * *